(12) United States Patent
Chandil et al.

(10) Patent No.: US 11,461,947 B2
(45) Date of Patent: Oct. 4, 2022

(54) CONSTRAINED MODIFICATION OF VECTOR GRAPHICS

(71) Applicant: Adobe Inc., San Jose, CA (US)

(72) Inventors: Ashwani Chandil, Uttar Pradesh (IN); Wilmot Li, Seattle, WA (US); Vineet Batra, Delhi (IN); Matthew David Fisher, San Carlos, CA (US); Kevin Wampler, Seattle, WA (US); Daniel Kaufman, Seattle, WA (US); Ankit Phogat, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/187,273

(22) Filed: Feb. 26, 2021

(65) Prior Publication Data

US 2022/0277501 A1    Sep. 1, 2022

(51) Int. Cl.
*G06T 11/60* (2006.01)
*G06T 3/20* (2006.01)
*G06T 11/20* (2006.01)

(52) U.S. Cl.
CPC ............... *G06T 11/60* (2013.01); *G06T 3/20* (2013.01); *G06T 11/203* (2013.01); *G06T 2200/24* (2013.01)

(58) Field of Classification Search
CPC ......... G06T 11/60; G06T 3/20; G06T 11/203; G06T 2200/24
See application file for complete search history.

(56) References Cited

U.S. PATENT DOCUMENTS

2018/0061092 A1* 3/2018 Sasikumar ................ G06T 3/40
2020/0118309 A1* 4/2020 Biswas .................... G06T 11/60

* cited by examiner

*Primary Examiner* — Michelle L Sams
(74) *Attorney, Agent, or Firm* — Nicholson De Vos Webster & Elliot LLP

(57) ABSTRACT

Embodiments are disclosed for constrained modification of vector geometry. In particular, in one or more embodiments, the disclosed systems and methods comprise receiving a selection of a first segment of a vector graphic to be edited, identifying an active region associated with the first segment, wherein the active region includes the first segment and at least one second segment which comprise a geometric primitive, identifying the region of influence including at least one third segment connected to the active region, identifying at least one constraint associated with the active region or the region of influence based at least on the geometric primitive, receiving an edit to the active region, and generating an update for the vector graphic based on the edit and the at least one constraint.

20 Claims, 15 Drawing Sheets

CONSTRAINED MODIFICATION OF VECTOR GRAPHICS

BACKGROUND

1. Technical Field

The present disclosure relates generally to systems and method for editing vector graphics images. More specifically, one or more embodiments of the present disclosure relate to systems and methods that enable constrained modification of vector graphics.

2. Background and Relevant Art

Conventional computer graphic systems enable users to create various types of computer graphics content such as free form illustration, engineering design, or other types of technical or non-technical computer graphics. The computer graphics content created by the designer often includes complex underlying geometry. The most common representation for such geometry uses multiple cubic Bezier splines, each of which is commonly known as a path object. Typically, each path object includes multiple connected cubic Bezier segments.

The Bezier spline is the most fundamental construct for 2D vector graphics and is used for specifying geometry in almost all vector graphic applications. Typically, a Bezier spline includes multiple continuous piecewise Bezier segments, where each Bezier segment is specified by basis points of suitable degree. For example, cubic Bezier splines are most commonly used in mainstream applications, and each segment of the spline is specified by four control points. So, the cubic Bezier spline is specified by 3n+1 control points where n is the number of Bezier segments in the spline. A user reshapes the Bezier spline by manipulating control points of the respective Bezier segments which lies in the portion of the spline which needs to be transformed. However, such manual manipulation is tedious and difficult to perform accurately, especially for complex graphics. For example, the tools that enable manual manipulation do not have a way of detecting the context of the edits the user is making. As a result, the user is left to manually manipulate every control point individually to ensure their intent is reflected in the edited vector graphic. Other techniques allow for the modifications of vector graphics to be made in a shape-aware fashion. However, these existing techniques also have no way of detecting the context of the edits the user is making. As such, the user is required to specify how the modifications are to be implemented shape by shape before making them and must be repeated for each edit.

These and other problems exist with regard to modification of vector graphics in digital visual media.

BRIEF SUMMARY

Introduced here are techniques/technologies that enable constrained modification of vector geometry in vector-based graphics. In particular, in one or more embodiments, the disclosed systems and methods comprise a content design system that receives a selection of at least one Bezier segments of a vector graphic. The content design system determines whether the selected segment is part of a geometric primitive (e.g., a straight line, circular arc, etc.). If so, the content design system automatically expands the user's selection to include adjacent segments that comprise the geometric primitive. For example, if the selected segment is part of a circular arc, then any other segments that form that circular arc are also selected. These selected segments correspond to an active region which the user will modify directly (e.g., by translating or otherwise editing the active region). To preserve the underlying geometry of the vector graphic, the content design system then identifies a region of influence, which includes segments connected to the active region. For example, if the adjacent segments to the active region correspond to another geometric primitive, then they are added to the region of influence. Any remaining segments not belonging to the active region or the region of influence belong to the passive region which is not modified when the active region is modified.

When the user modifies the active region, the modifications to the active region and/or region of influence are constrained based on one or more constraints that are determined from the underlying geometry of the vector graphic. For example, if the region of influence includes a circular arc, then a similarity constraint is imposed on the region of influence to ensure that the modified region of influence remains circular arc-like. This allows for the vector graphic to be edited more accurately and efficiently while retaining the overall geometry of the vector graphic.

Additional features and advantages of exemplary embodiments of the present disclosure are set forth in the description which follows, and in part are obvious from the description, or are learnable by the practice of such exemplary embodiments.

BRIEF DESCRIPTION OF THE DRAWINGS

The detailed description is described with reference to the accompanying drawings in which.

DETAILED DESCRIPTION

Figure 1:
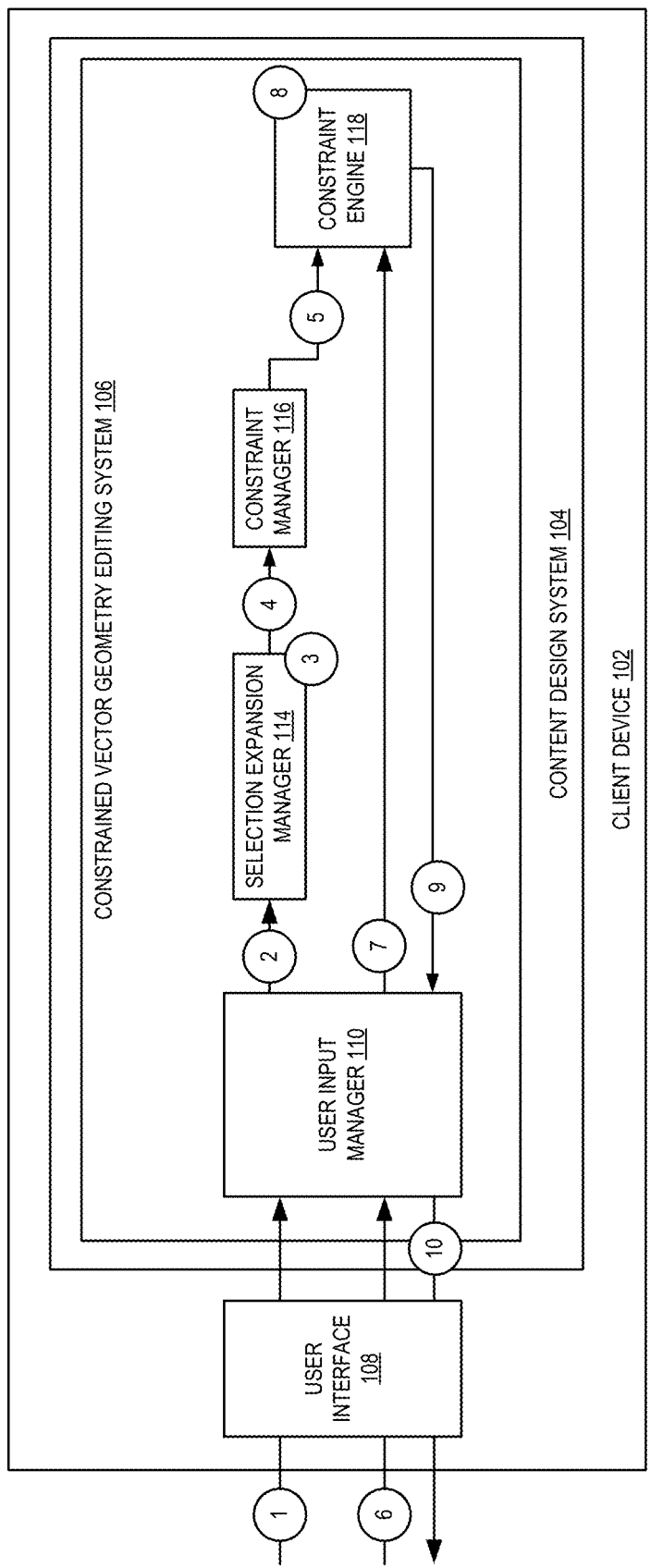
FIG. 1 illustrates a diagram of constrained modification of vector graphics, in accordance with one or more embodiments.

Control point manipulation is the simplest, and most direct method for modifying Bezier splines. For example, a user selects a particular Bezier segment with a selection tool and then re-positions one or more basis points of the selected Bezier segment to control its geometry. However, this method requires a high degree of precision and control, as the tool is not aware of the underlying details of the design being edited or designer's intent. In practice, this often proves to be challenging and tedious as designers are forced to specify an appropriate location for each control point manually. For touch-enabled tablet devices, such manipulations become even more imprecise and impractical. An additional challenge of using control point manipulation is that it fails to preserve regular geometric primitives (such as arcs and lines) which are frequently used in many graphic design workflows. Moreover, it does not maintain any higher-level structural relationships (such as parallel, concentric etc.) between paths.

One or more embodiments of the present disclosure include a content design system that enable constrained modification of vector graphics. Instead of users having to move individual control points, embodiments treat a segment as the atomic unit of a vector graphic and automatically infer constraints to be imposed on the edited segment and its neighboring segments to enable higher-level editing of vector graphics without requiring specific inputs from the user to define their intent. When editing a vector graphic, the user selects a segment of the vector graphic. This forms the active region which represents the portion of the vector graphic which the user is directly editing. In conventional systems, editing a single segment like this likely leads to unwanted deformations of the underlying artwork, as existing editing tools have no way of detecting the underlying geometry of the artwork. To address this shortcoming, embodiments automatically expand the active region to include additional neighboring segments. For example, when a user selects a segment of a vector graphic, the editing system analyzes the segment and its neighboring segments to determine whether they belong to a geometric primitive (e.g., a circular arc, a straight line, an elliptical arc, a parabola, etc.). If the segment and one or more of its neighboring segments form a geometric primitive, then user's selection is expanded to include the explicitly selected segment and the neighboring segments. This forms the active region which corresponds to the segments that the user is directly modifying in the vector graphic. As such, when the user makes edits to the active region, the underlying geometric primitive is edited as a whole. This avoids unwanted deformations without requiring extensive manual editing on the part of the user.

Additionally, or alternatively, in some embodiments, the editing system analyzes the segment and non-neighboring segments to determine if the segment and non-neighboring segments form a geometric primitive. If so, the user's selection is expanded to include the explicitly selected segment and the non-neighboring segments. For example, if a selected segment is colinear with additional non-contiguous segments then the user's selection is expanded to include the non-contiguous colinear segments. Similarly, if a segment and one or more additional non-contiguous segments are arc segments which lie on the same implied circle, then the user's selection is likewise expanded to include these non-contiguous segments. Additionally, or alternatively, other relationships between segments are used to expand selection. For example, in some embodiments, a user's selection is expanded to include segments that are parallel to the selected segment (e.g., parallel line segments) or segments that are concentric with the selected segment (e.g., concentric arc segments).

Generally, the active region forms a subset of the overall vector graphic being modified. As such, if the active region is modified, it is likely that this will lead to the modification of nearby segments. In conventional systems, these nearby segments are modified as ordinary Bezier segments, which often leads to distortions and loss of the underlying geometry of the vector graphic in the absence of extensive manual editing by the user. As such, embodiments automatically identify the segments that are directly connected to the active region as a region of influence. This region of influence represents a portion of the vector graphic which is likely to be modified due to the modifications the user makes to the active region. Accordingly, embodiments analyze these connected segments region in the region of influence to determine if they form a geometric primitive connected to the active region. If so, the region of influence is automatically expanded to include all adjacent segments that form the adjacent geometric primitive. This enables the segments of both the active region and the region of influence to be modified together such that they retain their underlying geometry with minimal input from the user.

Additionally, modifications to the active region and the region of influence are constrained based on one or more constraints determined from the underlying geometry of the vector graphic. These constraints are automatically inferred from the underlying geometry without additional user input. For example, the system infers that portions of the vector graphic that represent geometric primitives before modification are to remain geometric primitives after modification, and automatically identifies constraints that ensure this outcome. Likewise, constraints are automatically inferred to ensure that connections between segments that have smooth continuity prior to modification remain so after modification. For example, if the region of influence forms a circular arc, then after the modification the region of influence should still remain arc-like, even if it is now scaled to a different size due to the modifications that were made to the active region.

Once the segments and constraints have been identified, the constraints are provided to a constraint engine which solves for the updated state of the vector graphic as the user modifies the active region. This ensures that the constraints are imposed on the vector graphic as the user edits the vector graphic, preserving the underlying geometric characteristics automatically. This constrained modification is performed automatically, without additional user input, enabling vector graphics to be easily modified.

Term Definitions

As used herein, the term "control points" refers to one or more points that define the shape of a Bezier segment. For example, a quadratic Bezier segment includes three control points while a cubic Bezier segment includes four control points.

As used herein, the term "basis points" refers to a set of all control points that define a Bezier curve. For example, the basis points of a quadratic Bezier segment include all three control points while the basis points of a cubic Bezier segment include all four control points.

As used herein, the term "anchor points" refer to a set of points that define the beginning and ends of segments. Anchor points are also added to subdivide an existing segment into subsegments for editing. Anchor points are selected and moved to change the direction and/or curvature of a segment.

As used herein, the term "active region" refers to the Bezier segments explicitly selected by the designer. Additionally, in cases where a selected segment is part of a regular geometric primitive, then the active region is expanded to include all neighboring segments that are part of the geometric primitive.

As used herein, the term "region of influence" refers to segments adjacent to the active region. At least one segment of the region of influence is connected to at least one segment of the active region. When a segment of the region of influence is part of a regular geometric primitive, then all of the segments that are part of that geometric primitive are added to the region of influence.

As used herein, the term "passive region" refers to segments which are not part of the active region and which are not part of the region of influence are added to passive region.

As used herein, the term "geometric primitive" refers to the simplest geometric shapes that the editing system is configured to identify for selection expansion. For example, geometric primitives include circular arcs, straight lines, elliptical arcs, parabolas, etc.

Referring now to the figures, FIG. 1 illustrates a diagram of constrained modification of vector graphics, in accordance with one or more embodiments. As shown in FIG. 1, a client device 102 includes a content design system 104 as well as the editing system 106. The content design system 104 generally facilitates the creation, modification, sharing, and/or deletion of graphical content including vector-based content. In one or more embodiments, the content design system 104 is a design application such as ADOBE® ILLUSTRATOR®. In other embodiments, the content design system 104 includes multiple applications, functions, and operations relating to graphical content, such as an application suite, a web-based application, and/or system operations on the client device 102.

As shown in FIG. 1, the content design system 104 includes the editing system 106. In some embodiments, however, the editing system 106 is located on the client device apart from the content design system 104. In some embodiments, a user interacts with client device 102 via user interface 108 (such as a graphic user interface rendered on a display device). In some embodiments, the user interacts with the user interface 108 via a touchscreen interface, a pointing device (e.g., mouse, trackpad, etc.), keyboard, and/or other user input device(s). The inputs the user provides via user interface 108 are received by user input manager 110 at numeral 1. For example, the user input manager 110 enables a user to select one or more segments in a vector graphics file which is being edited in content design system 104.

As discussed, and as is explained in detail below, the editing system 106 enables the editing of cubic Bezier splines (e.g., cubic Bezier curves) based on constraints inferred from the underlying geometry of the graphic being edited using various approaches and techniques. As also described previously, the editing system enables vector-based content that includes particular geometric primitives to be more efficiently and more accurately edited than conventional systems. For example, when the user selects a segment via user interface 108, the selected segment is provided to selection expansion manager 114, at numeral 2. Selection expansion manager determines an active region of the vector graphic which corresponds to the selected segment. If the selected segment is part of a geometric primitive (e.g., a line, an elliptical arc, a circular arc, etc.), then selection expansion manager 114 automatically expands the active region to include nearby segments that are fit to the geometric primitive, at numeral 3. Selection expansion manager also identifies a region of influence of the vector graphic based on the active region. For example, any segments connected to the active region belong to the region of influence. The selection expansion manager likewise determines if these segments are part of a geometric primitive and, if so, expands the region of influence accordingly. Any remaining segments of the vector graphic belong to the passive region, which remains unmodified when the active region is edited.

At numeral 4, the selection expansion manager 114 provides the identified geometric primitives to constraint manager 116. Constraint manager 116 infers constraints based on the underlying geometry of the vector graphic and applied to the region of influence and/or the active region of the vector graphic. For example, a continuity constraint, similarity constraint, and/or fixed affine constraint are determined to apply based on the underlying geometry. Constraints are identified by the constraint manager for each region of the vector graphic. These constraints are then provided to constraint engine 118 at numeral 5. At numeral 6, a user input is received by user input manager 110 via user interface 108 to edit the active region. In some embodiments, this edit includes translating the active region from a first location to a second location. Additionally, or alternatively, other edits are also performable on the active region. At numeral 7, the edits are provided to constraint engine 118.

Constraint engine then applied the constraints received from constraint manager 116 to the active region and region of influence to calculate a new state of the vector graphic at numeral 8. This new state is calculated to ensure that is complies with the constraints placed on the original vector graphic. For example, if the active region includes a circular arc, then following the edit the active region remains circular arc-like. The updated state of the vector graphic is then returned at numeral 9 to user input manager 110 which then renders the updated vector graphic for display on user interface 108 at numeral 10.

Figure 2:
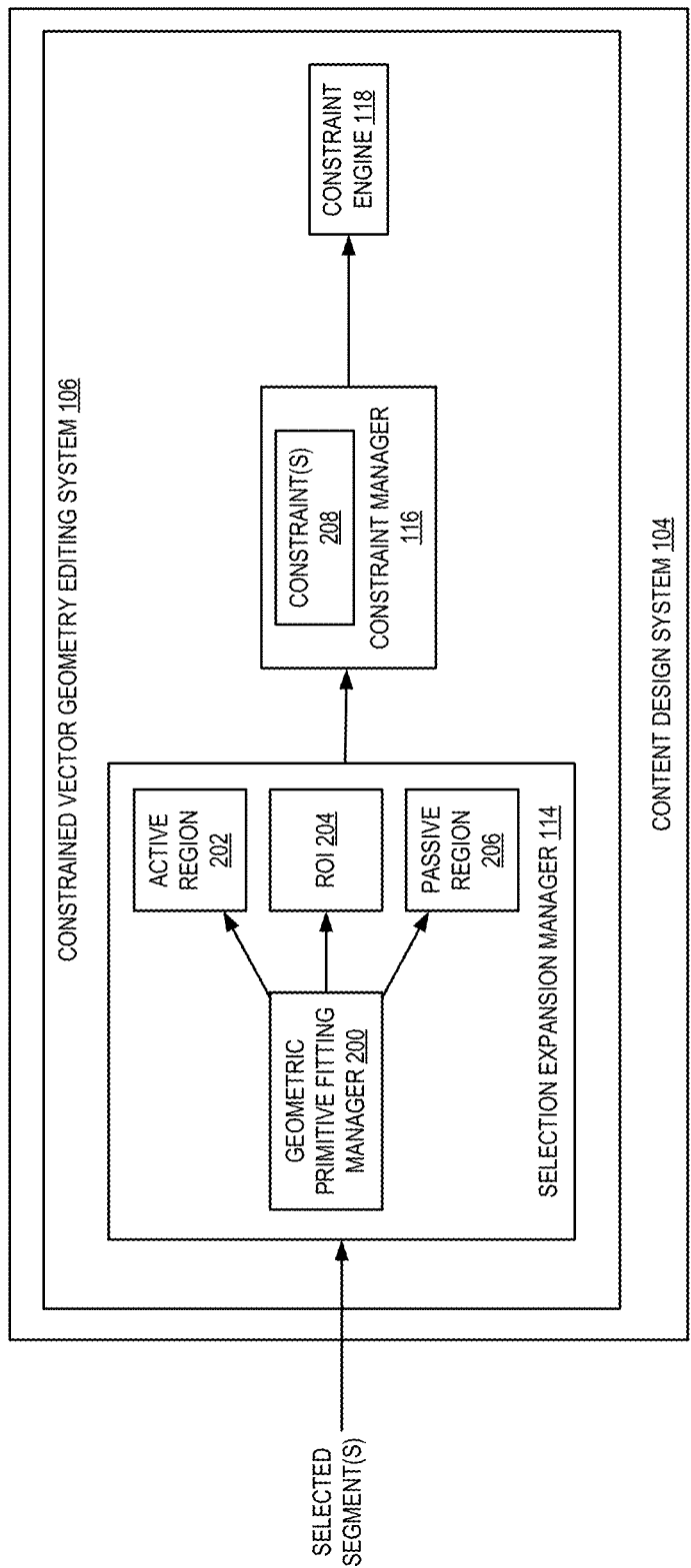
FIG. 2 illustrates a diagram of a constrained vector geometry editing system, in accordance with one or more embodiments.

FIG. 2 illustrates a diagram of a constrained vector geometry editing system, in accordance with one or more embodiments. As discussed, when the user selects a segment of a vector graphic, the selected segment is provided to selection expansion manager 114. Selection expansion manager 114 includes geometric primitive fitting manager 200 which is responsible for determining whether the selected segment is, or is part of, a geometric primitive. Geometric primitive fitting manager 200 implements one or more fitting techniques depending on the types of geometric primitives that are supported. For example, the geometric primitive fitting manager 200 identifies a selected segment as a straight line based on the control points defining that segment. The geometric primitive fitting manager 200 then identifies any adjacent co-linear segments based on their control points. For more complicated primitives, such as arcs, a modified objective function is used to efficiently determine whether the selected segment and any adjacent segments fit the arc. As discussed in more detail with respect at least to FIGS. 6A and 6B, points are sampled from the selected segment and adjacent segment and evaluated using the modified objective function to determine whether the sampled points fit an arc within a margin of error.

Once the geometric primitive fitting manager 200 fits a primitive to the selected segments and any adjacent segments, these segments are added to active region 202. The geometric primitive fitting manager 200 then evaluates any segments connected to the active region 202 to identify segments belonging to the region of influence (ROI) 204. As discussed, initially, the ROI includes any segments directly connected to a segment in the active region 202. The geometric primitive fitting manager 200 then determines whether any of these segments are part of a geometric primitive using the techniques used for the selected segment in the active region. If any of the initial ROI segments are part of a geometric primitive, then the other segments of the geometric primitive are also added to the ROI 204. Any remaining segments of the vector graphic are then added to the passive region 206 which is not modified when the active region is modified. In some embodiments, the active region and/or the ROI are expanded to include contiguous or non-contiguous segments based on the identified underlying geometric primitives.

The identified geometric primitives are then provided to constraint manager 116 to identify one or more constraints 208 to be applied to the active region 202 and ROI 204. As discussed, constraints 208 include one or more of a continuity constraint, similarity constraint, and/or fixed affine constraint. For example, a continuity constraint constrains curve connections to preserve existing C1 and/or G1 (with fixed tangent proportions) continuities in the input geometry using linear constraints. These constraints are inferred from input geometry and applied to all Bezier segments when solving for modified geometry. The intuition is that smooth joins and corners should be retained. A similarity constraint constrains curve segments to change by closest similarity transform as segment end points are displaced. For example, in some embodiments, a similarity constraint is applied to the segments of the region of influence to ensure that the region of influence retains its shape during modifications (e.g., a circular arc remains circular). Subsequently, when the user modifies the active region, the modification and the constraints are used by constraint engine 118 to update the state of the vector graphic such that modifications are implemented according to the constraints. As a result, modified shapes remain similar, continuous connections remain smooth, etc. This results in changes to the vector graphic that retain the underlying shape of the vector graphic (e.g., arcs remain arc-like, etc.) which likely tracks the intentions of the user.

Figure 3:
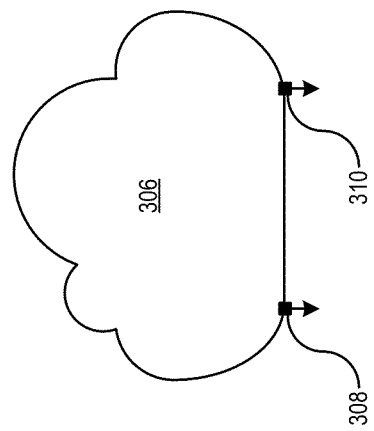
FIG. 3 illustrates a diagram of editing a vector-based design.
Figure 3:
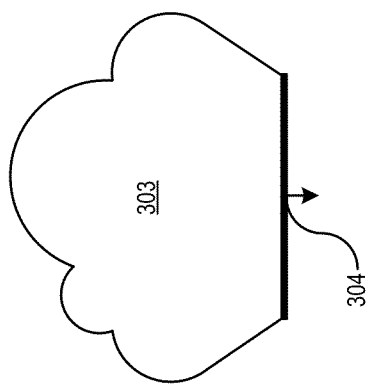
Figure 3:
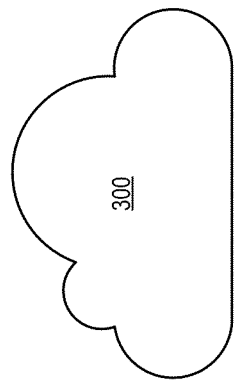

FIG. 3 illustrates a diagram of editing a vector-based design. As discussed, a content design system enables a designer to create complex shapes based on regular geometric primitives (e.g., arcs, circles, lines, etc.). For example, as shown in FIG. 3, a designer creates a shape 300 in a content design system. For example, a designer is enabled to create shape 300 in a number of ways, such as creating a connecting arc and line segments, merging a number of shapes using Boolean operations, etc. However, as discussed below, if the designer subsequently wishes to edit this, the editing process is often tedious and difficult to perform precisely. For example, direct manipulation tools do not understand the underlying 'circular-ness' of various Bezier segments in the geometry of shape 300 and, even a simple edit such as dragging line segment 304 downwards results in the shape losing it inherent structure and aesthetics, as shown in shape 302. Note that even though the designer intentionally created circular arcs, the tool still assumed these to be generic Bezier segments. Likewise, if the designer manipulates anchor points 308, 310 of the shape 300 the resulting shape also loses its inherent structure as shown at shape 306, as the modified segments are treated as generic Bezier segments.

To address these shortcomings, embodiments identify and apply implicit structural constraints that are imposed when the vector graphic is edited. These constraints preserve high-level structural relationships in the given design, and thus maintains its overall characteristics. Embodiments infer and apply these constraints automatically at runtime, without any manual annotation from the designer.

Figure 4:
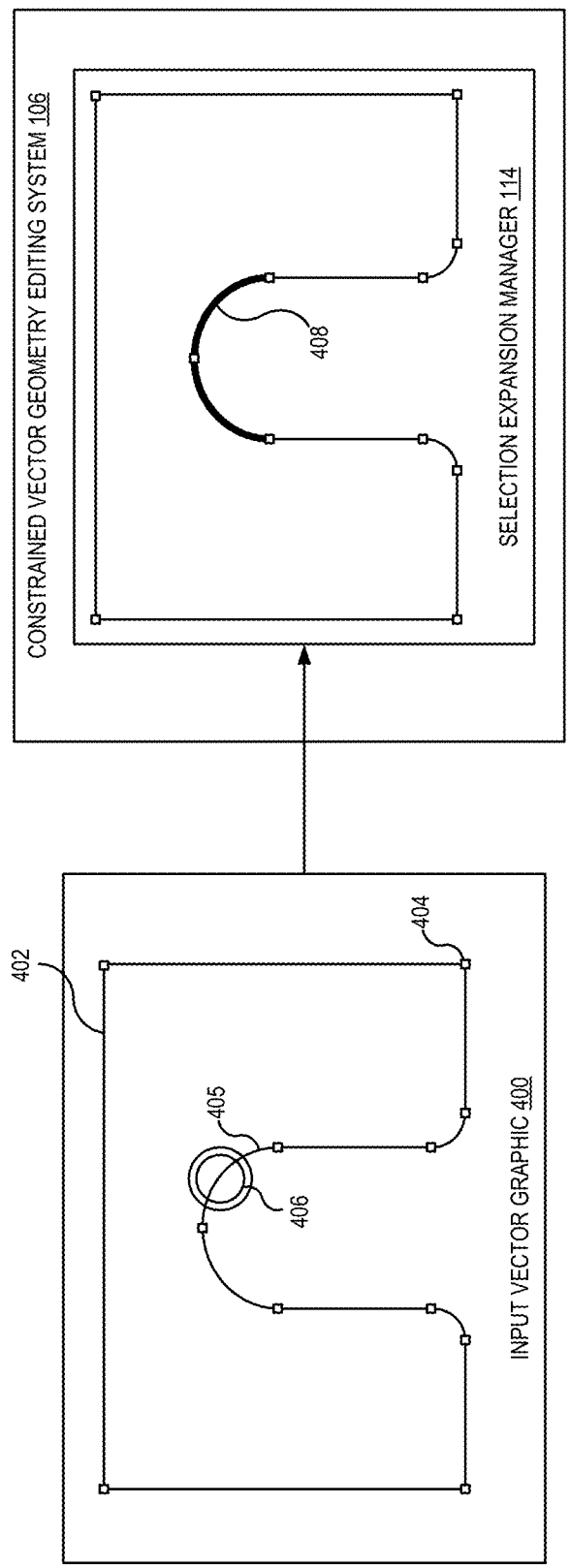
FIG. 4 illustrates an example of identifying an active region in accordance with one or more embodiments.

FIG. 4 illustrates an example of identifying an active region in accordance with one or more embodiments. As shown in FIG. 4, an input vector geometry 400 includes a plurality of segments 402. Each segment is a Bezier curve or a line. In the example shown in FIG. 4, each segment is a Bezier curve. Each segment is defined by a plurality of control points. In vector-based graphics, and as used herein, "control points" refer to a set of points that influence and define the shape of a Bezier spline. For example, a quadratic Bezier spline includes three control points while a cubic Bezier spline includes four control points. Additionally, the end of each segment includes an anchor point 404. As used herein, "anchor points" refer to a set of points that define the beginning and ends of segments. Anchor points are also used to subdivide a segment into subsegments for editing. The anchor points are selected and moved to change the direction and/or curvature of the segment. In some embodiments, control points are connected to anchor points via handles.

Given an input vector geometry 400, Bezier segments in the input geometry are mapped to different regions. In various embodiments, a given region includes a single segment or multiple segments. As shown in FIG. 4, a user selects a segment of the vector graphic 400 (e.g., by clicking, tapping, or otherwise interacting with a graphical user interface to indicate their selection). In this example, the user taps the vector graphic 400 at area 406. This region corresponds to the Bezier segments explicitly selected by the designer. In the example of FIG. 4, this region includes a single segment 405. The input geometry and selected segment(s) are then received by a selection expansion manager 114 of constrained vector geometry editing system 106. As discussed, editing a single selected segment often leads to a loss of the underlying shapes included in a vector graphic, such as due to distortions as shown above with respect to FIG. 2. Accordingly, selection expansion manager 114 takes the user's explicitly selected segment(s) and determines whether the explicitly selected segment(s) form at least part of a geometric primitive. In cases where a selected segment is part of a regular geometric primitive, then the active region is expanded to include any neighboring segments that are part of the geometric primitive. For example, as shown, following the user's selection at 406, selection expansion manager 114 attempts to fit a circular arc to segment 405 and its adjacent segments. As discussed further below, if a circular arc fits segment 405 and one or more adjacent segments, within an error tolerance, then the active region is automatically expanded by selection expansion manager to include all segments that fit the arc. This results in arc 408 being highlighted as the active region in the input vector graphic with expanded selection 410.

In some embodiments, arc 408 represents a single Bezier segment and is therefore selected because the user specifically selected it. Alternatively, arc 408 includes a plurality of segments that are combined to form arc 408. Although the example of FIG. 4 shows arc 408 including two segments, in various embodiments, such an arc is comprised of more than two segments. Because an arc is a geometric primitive, the entire arc, including all of the segments that comprise that arc are highlighted and thereafter treated as a single segment for editing purposes. Additional details are provided with respect to at least FIG. 6, below. The underlying rationale for this behavior is that even regular geometric primitives are often represented by Bezier segments in most vector graphic applications, but the number of such segments comprising a given primitive (such as a semi-circle) varies based on application as well as user behavior. The modification actions performed by the designer (such as a mouse drag, a gesture, etc.) are targeted to the active region.

Figure 5A:
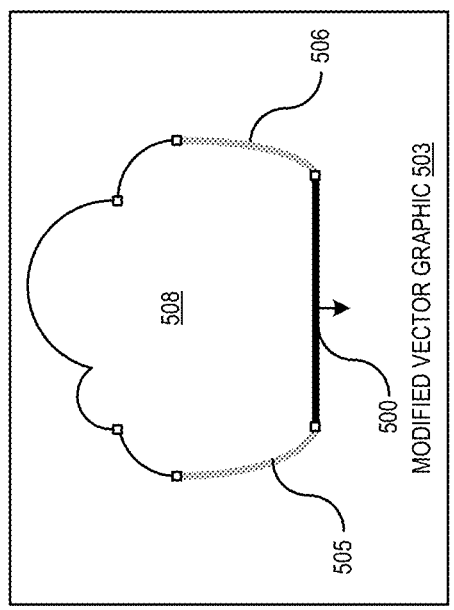
FIGS. 5A and 5B illustrate examples of editing of a vector graphic having different regions of influence, in accordance with an embodiment.
Figure 5A:
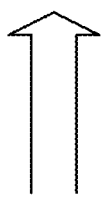
Figure 5A:
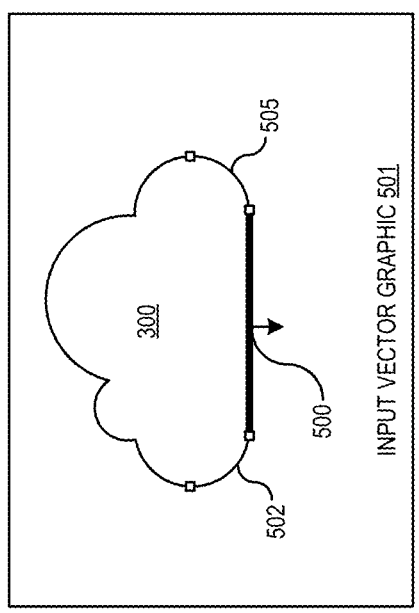
Figure 5B:
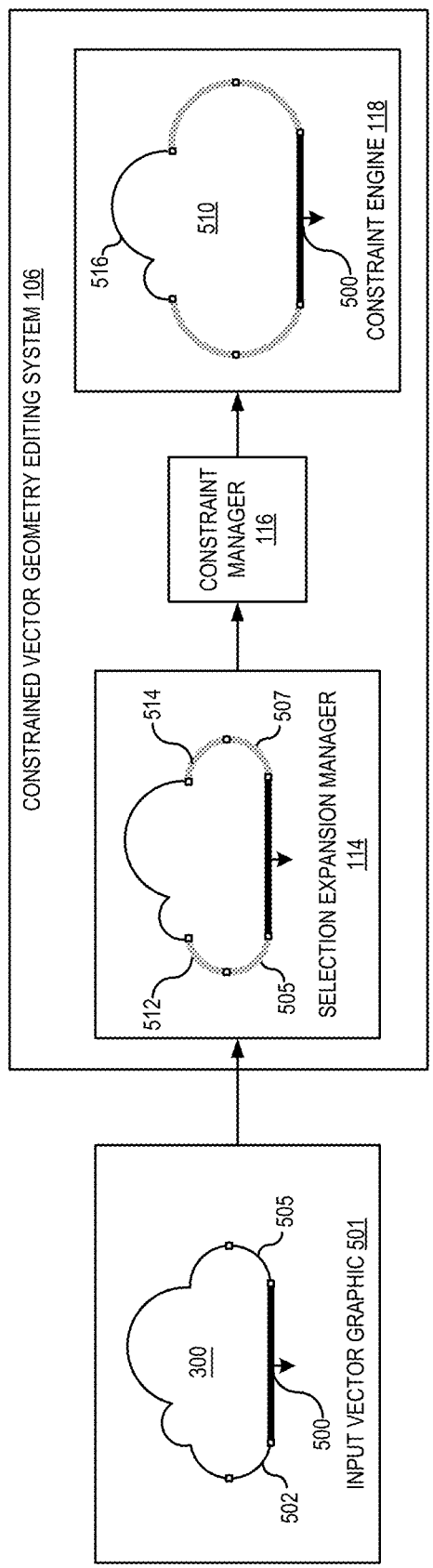

FIGS. 5A and 5B illustrate examples of editing of a vector graphic 501 having different regions of influence, in accordance with an embodiment. As discussed, the active region undergoes direct modification as a result of user actions (e.g., a translation of the active region from one location to another via user interaction). For example, a user selects anywhere on line 500 and the entire line (regardless of how many segments are included in that line) is highlighted as the active region. Although the example of FIG. 5A shows the active region highlighted via a heavier line width, in various embodiments the selection of the active region is shown through alternative visualizations. For example, the active region, in some embodiments, is highlighted in a color to indicate that the line is selected. Since the segments of the active region 500 are connected to adjacent segments 502, 504, these adjoining segments also need to be modified to maintain the continuity constraints between these segments (e.g., to ensure that line 500 remains connected to the rest of shape 300 if line 500 is translated to another position). However, current tools typically limit this modification to the connected tangents along the shared Bezier point; this preserves the continuity across this point but does not preserve the shape of adjoining segments.

As discussed, one technique to address this issue is to identify the segments adjacent to the active region as a region of influence. The way this region of influence is defined impacts how the modifications to the active region are translated into modifications to the region of influence and therefore to the shape as a whole. For example, in such an implementation, the region of influence is defined as the adjacent segments 504, 506, to the active region 500, shown in FIG. 5A by heavy weight grey segments. When the active region is modified (e.g., translated downward in the example of FIG. 5), then the region of influence takes on a stretched shape as shown in modified vector graphic 503. This results in a loss of the overall shape of shape 300, as the circular arcs are deformed, and is not likely to have been the intent of the designer.

Accordingly, embodiments automatically identify a number of segments adjacent to an active region which comprise a regular geometric primitive and add all of these segments to the region of influence. For example, as shown in FIG. 5B, the input vector graphic 501 are provided to selection expansion manager 114 of constrained vector geometry editing system 106. As discussed above at least with respect to FIG. 3, the selection expansion manager determines whether a segment is part of a geometric primitive. In the example of FIG. 5B, the selection expansion manager 114 identifies the segments adjacent to the active region 500 as the region of influence and then determines whether those segments are part of a geometric primitive. In this example, the selection expansion manager maps a circular arc to the adjacent segments 502, 504 and determines that they are parts of arcs 505, 507, respectively. As a result, as shown at shape 5409, the selection expansion manager expands the region of influence has been expanded to include segments 512 and 514. This way, the region of influence includes the full arcs adjacent to the active region 500. Although each circular arc shown in the example of FIG. 5B includes two segments, the arcs could include more or fewer segments.

The region of influence is identified at least initially as one or more segments that are adjacent to the active region. In some embodiments, the region of influence is expanded by fitting a geometric primitive to the adjacent segments and any adjacent segments that are successfully fit to the geometric primitive (within a configurable margin of error) are added to the region of influence. As such, if an adjacent segment is not part of a geometric primitive, then the region of influence includes just the adjacent segment, but if it is part of a geometric primitive, then the region of influence is expanded to include all of the segments that form that geometric primitive. Therefore, a given adjacent geometric primitive including an arbitrary number of segments is still identified as part of the region of influence.

In addition to the active region and the region of influence, the editing system also identifies a passive region. As discussed, the passive region includes segments which are not actively selected by the user (e.g., the active region), and which are not directly connected to these selected segments (e.g., the region of influence). In other words, any segments should not be affected by the designer's modifications to the active region are added to passive region. Here, the objective is to minimize any kind of deformation to segments in passive region. As such, the resulting modifications are localized within the active region and the region of influence, this provides improved predictability to the designer to know which portions of their vector graphic will be modified by a given action. In the example of FIG. 5B, the passive region 516 is indicated by a lighter weight lines of shape 510.

Once the selection expansion manager 114 has expanded the region of influence, the input vector graphic and the identified regions (e.g., active region, region of influence, and passive region) are provided to constraint manager 116. Constraint manager 116 then determines one or more constraints to be applied to the vector graphic based on the underlying geometry. For example, and as discussed further below, a continuity constraint constrains curve connections to preserve existing C1 and/or G1 (with fixed tangent proportions) continuities in the input geometry using linear constraints. A similarity constraint constrains curve segments to change by closest similarity transform as segment end points are displaced. For example, in some embodiments, a similarity constraint is applied to the segments of the region of influence to ensure that the region of influence retains its shape during modifications (e.g., a circular arc remains circular). Additionally, a fixed affine constraint constrains curve segments to respect a specified "fixed" affine transformation initialized to identity at start.

When a modification to the active region is received (such as translating the active region downward, as shown in FIG. 5B), the constraints are provided to constraint engine 118 by constraint manager 116, such that the vector graphic is modified according to the constraints. The constraint engine 118 then calculates the new state of the regions of the input vector graphic according to the constraints. As a result, all of the segments in the active region 500 and region of influence are modified harmoniously during the editing process. For example, a similarity constraint is applied to the region of influence such that the resulting region of influence is similar to the original region of influence. This ensures that the "circle-ness" is retained when the active region is translated downward, as shown in shape 510.

Figure 6A:
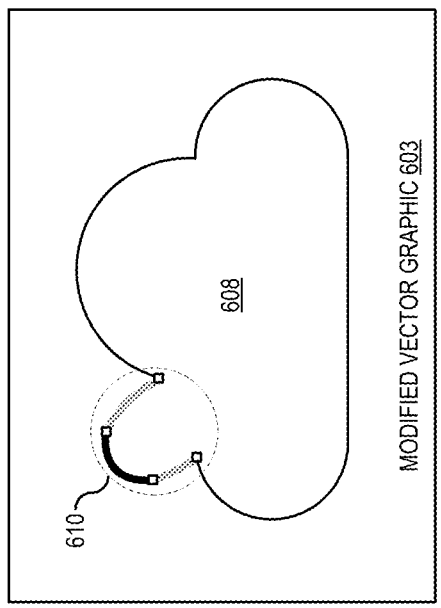
FIGS. 6A and 6B illustrate examples of constrained editing of a vector graphic using a single Bezier segment and a whole circular arc, in accordance with an embodiment.
Figure 6A:
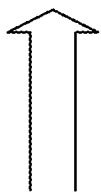
Figure 6A:
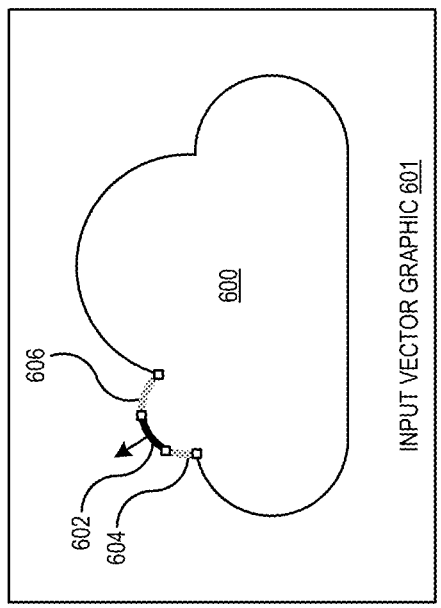
Figure 6B:
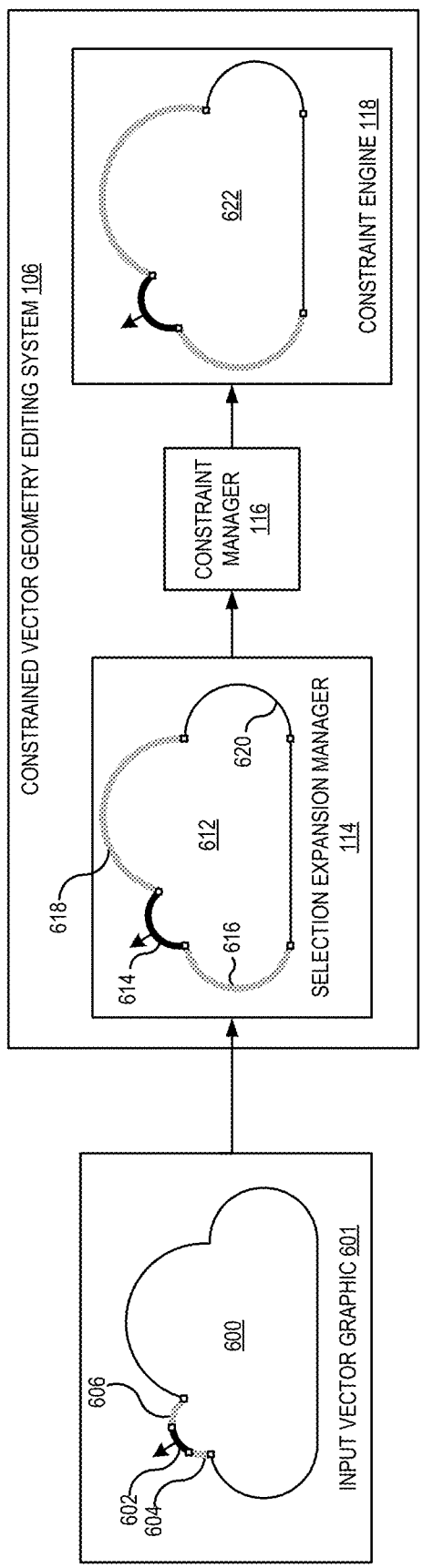

FIGS. 6A and 6B illustrate examples of constrained editing of a vector graphic using a single Bezier segment and a whole circular arc, in accordance with an embodiment. As shown in FIG. 6A, a designer creates, loads, or otherwise accesses a vector graphic 601 that includes object 600. The designer selects a segment 602 to modify. As the circular arc includes multiple segments (502, 604, and 606), if the designer were to modify selected segment 602, the result would be object 608, in which the previously circular arc has been stretched, resulting in deformed segments 610. As discussed, by treating the segments as generic Bezier segments for modification, rather than as part of a larger geometric primitive, the designer's likely intent is frustrated. Instead, embodiments identify segments 602-606 as being part of a geometric primitive and automatically expand the designer's selection to include all three segments in the active region.

As discussed, in various embodiments, the editing system identifies one or more geometric primitives, such as lines, circular arcs, ellipses, parabolas, etc., from a set of Bezier segments, which are then used for selection expansion. For example, selection expansion manager 114 expands a user's selection to straight lines by identifying any other straight-line segments that are colinear with the selected segment. In some embodiments, the editing system identifies connected segments that are colinear (e.g., contiguous segments). Additionally, or alternatively, the editing system identifies any colinear segments regardless of whether they are connected to the selected segment (e.g., contiguous, and non-contiguous segments).

To identify adjacent circular arcs, the selection expansion manager 114 fits a circle or sphere in two and higher dimensions, respectively. Fitting a sphere to a set of points using a least-squares objective function does not have a known closed-form solution. For this reason, embodiments use a modified objective function which provides a significantly more efficient algorithm. This technique provides a closed-form solution by modifying the standard least-squares objective function for fitting a circle to a set of points. For a set of n points $p_1, \ldots, p_n$ in d-dimensional space, this objective function measures the error in the fit obtained by a d-dimensional sphere with center c and radius r as:

$$f(c,r)=[(r^2-\|p-c\|^2)^2]$$

Where $$[f(c,r)] = \frac{1}{n}\sum_{i=1}^{n} f(p_i)$$

computes the expectation over all the $p_i$ data points. First, r is solved for by differentiating with respect to r and setting to zero:

$$\frac{\partial}{\partial r}f(r,c) = 0$$
$$4r[r^2 - \|p-c\|^2] = 0$$
$$r^2 = \|p-c\|^2$$
$$r^2 = [\|p\|^2] - 2[p]^T + \|c\|^2$$

This enables the optimal value of r to be found, provided the optimal value for c is known. Alternatively, in some embodiments this is generalized to instead substitute the optimal value of $r^2$ directly into the objective function.

$$f(c,r)=[(r^2-\|p-c\|^2)^2]$$
$$f(c)=[(([\|p\|^2]-2[p]^T+\|c\|^2-\|p-c\|^2)^2]$$
$$=[([\|p\|^2]-\|p\|^2+2(p-[p])c)^2]$$
$$=[\|p\|^2]-4[p,\|p\|^2]^T c+4c^T[p,p]c$$

This is a quadratic function of c so it solvable in closed form as:

$$c = \frac{1}{2}[p,p]^{-1}[p,\|p\|^2]$$

Once c is found, then r is solved for using the equation described above. Points from adjacent segments are sampled iteratively from the set of appropriate Bezier segments in the input geometry and the above-described techniques are used to fit a circle to the segments. Then the residual L2 norm is computed after fitting a circle to these sampled points. If this residue is less than a configurable threshold, then the editing system infers that the segments belong to a regular circular arc. Additionally, the start and end angles for such arc are then computed.

As discussed, these techniques are used by selection expansion manager 114 to perform selection expansion. In the example of FIG. 6B, the designer selects segment 602 and the selection expansion manager 114 identifies other segments adjacent to the selected segment that also belong to the same geometric primitive, in this instance, segments 604 and 606. This results in active region 614 being identified by selection expansion manager 114. Additionally, these techniques are used to expand the region of influence to include adjacent geometric primitives 616 and 618. For example, the adjacent segments to the active region are analyzed by selection expansion manager 114, which fits a geometric primitive to the adjacent segments to determine whether the immediately adjacent segments are part of a larger geometric primitive. If so, then any additional segments that fit that geometric primitive are likewise added to the region of influence. In addition to fitting lines/planes and circles/spheres to input geometry of a vector graphic, embodiments support other geometric primitives. For example, in some embodiments, parabolas and/or ellipses are fit to the underlying geometry of an input vector graphic, and segments matching that geometry are added to the active region and/or region of influence.

Once the selection expansion manager 114 has identified the active region 614, region of influence 616, 618, and passive region 620, these regions are provided to constraint manager 116. As discussed, constraint manager 116 then determines one or more constraints to be applied to the vector graphic based on the underlying geometry (e.g., continuity constraints, similarity constraints, fixed affine constraints, etc.). When a modification to the active region 614 is received (such as translating the active region up and to the left, as shown in FIG. 6B), the constraints are provided to constraint engine 118 by constraint manager 116, such that the vector graphic is modified according to the constraints. The constraint engine 118 then calculates the new state of the regions of the input vector graphic according to the constraints. As a result, all of the segments in the active region 400 and region of influence are modified harmoniously during the editing process. In this example, this results in modified object 622, in which the active region and the region of influence have retained their circular arc shapes following the modification of the active region.

Figure 7:
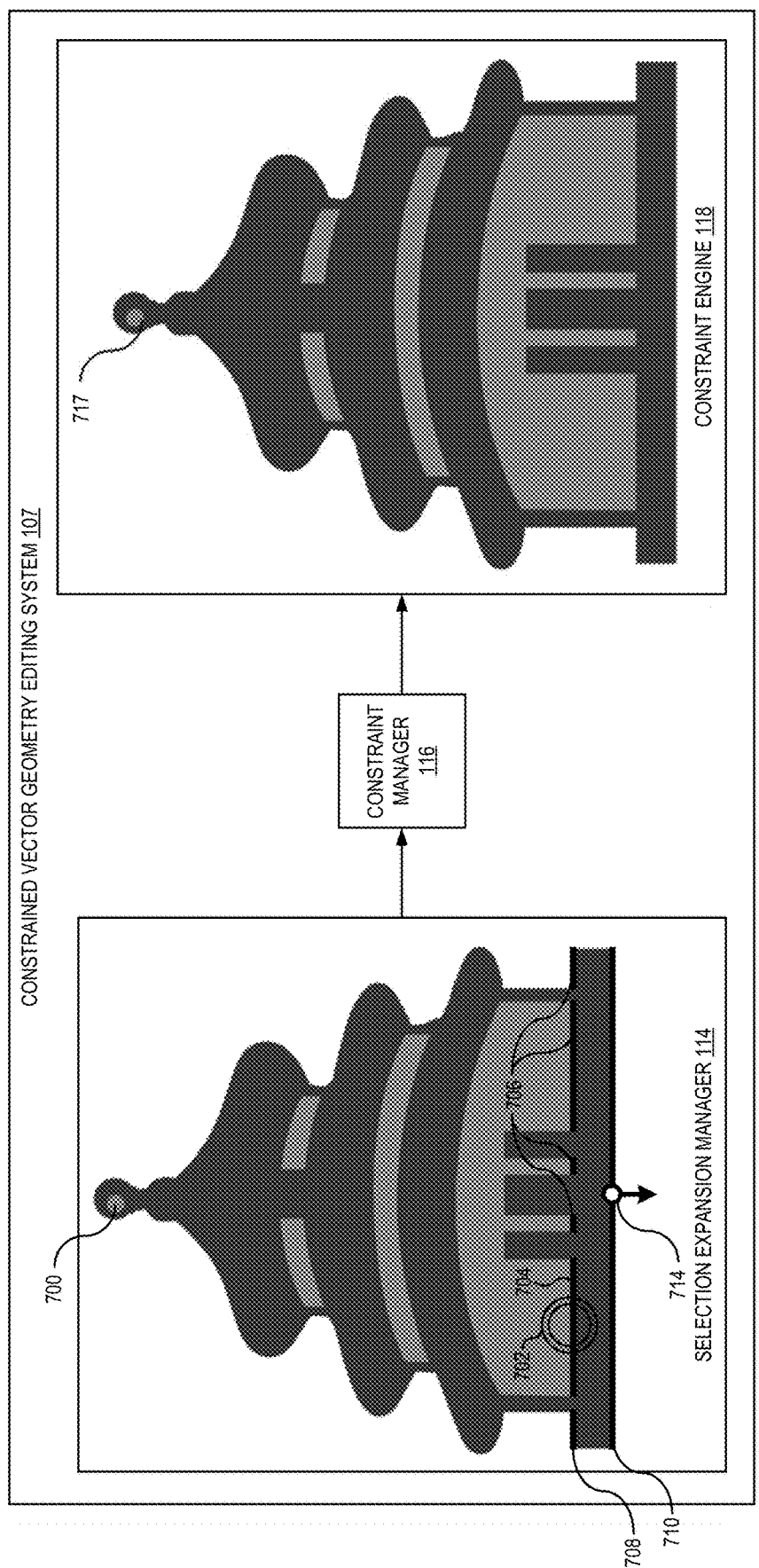
FIG. 7 illustrates an example of constrained editing of a vector graphic based on non-contiguous and parallel segments, in accordance with an embodiment.

FIG. 7 illustrates an example of constrained editing of a vector graphic based on non-contiguous and parallel segments, in accordance with an embodiment. As shown in FIG. 7, a user selects a segment of the vector graphic 700 (e.g., by clicking, tapping, or otherwise interacting with a graphical user interface to indicate their selection). In this example, the user taps the vector graphic 700 at area 702 above line segment 704. As discussed above, the selection expansion manager 114 automatically expands the selection to include colinear segments. In the example of FIG. 7, there are no contiguous colinear segments, however there are a number of non-contiguous colinear segments. In some embodiments, selection expansion extends to non-contiguous segments as well as contiguous segments. Accordingly, in the example of FIG. 7, the editing system samples points along segments in the vicinity of the selected segment 704 to identify colinear segments. For example, segments 706 and 708 are identified as being colinear with segment 704 (e.g., based on the coordinates/angles of the control points that define the segments and points sampled from along the segments, etc.).

Additionally, in some embodiments, the selection expansion manager 114 identifies parallel segments to the selected segments. For example, segment 710 is parallel to segments 704-708. In some embodiments, a segment is identified as being parallel if a translation mapping would make the segment colinear with the selected segments (e.g., if the segment is offset a fixed distance from the selected segments). In some embodiments, points along the selected segment and corresponding points along the segment under examination are compared to determine if they are a fixed distance apart at each X or Y location of the sampled points.

The selection expansion manager 114 expands the selection to include contiguous segments, non-contiguous segments, and/or parallel segments, to form the active region. Though not shown, the selection expansion manager 114 also identifies the region of influence based on the active region, as discussed, as well as the passive region. Once the regions have been identified by the selection expansion manager 114, they are provided to constraint manager 116 which infers one or more constraints to be imposed on the editing of the vector graphic 700. Subsequently, the designer selects a point 714 on the active region and modifies the selection (e.g., by dragging the selection in a direction). The constraint engine 118 then solves for a new state of the vector graphic based on the modification from the user and the constraints identified by the constraint manager 116 to produce modified vector graphic 716.

Figure 8:
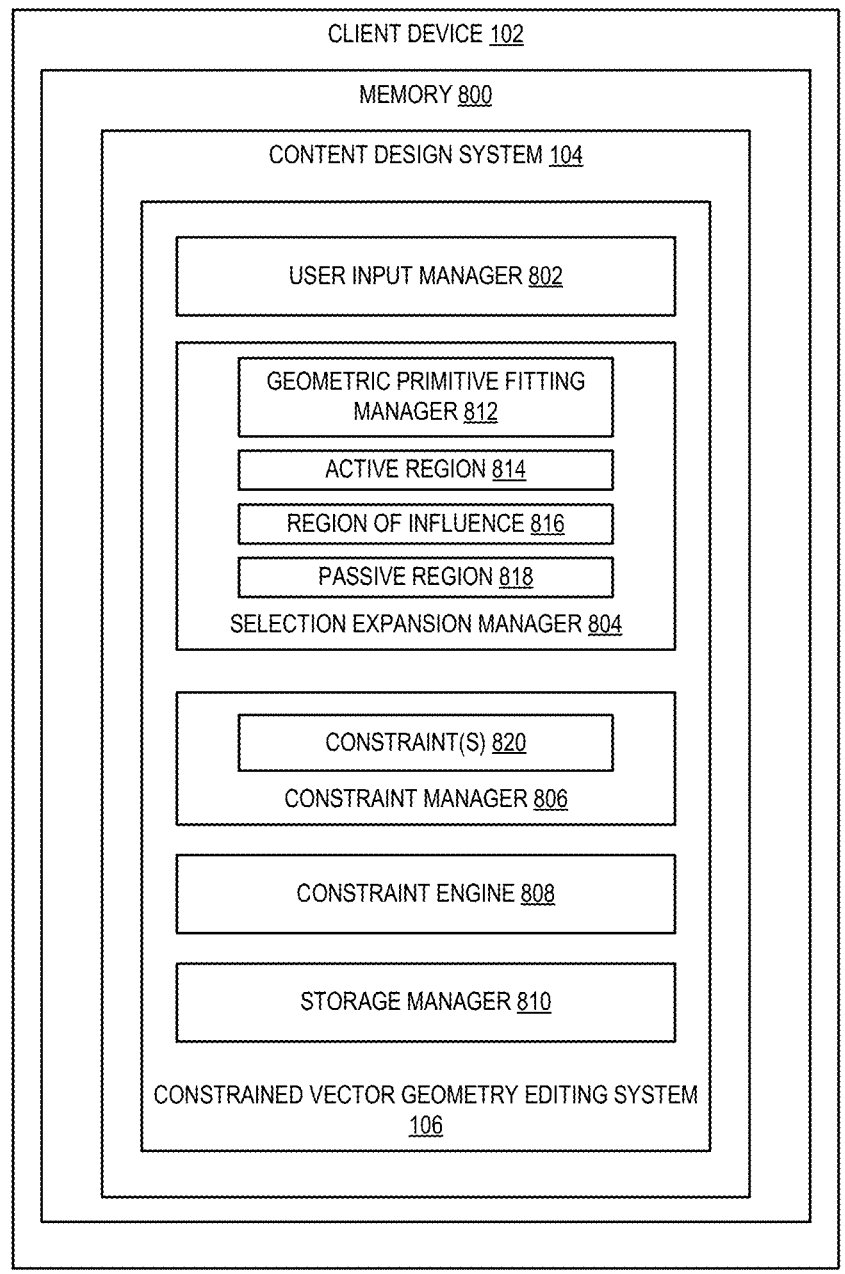
FIG. 8 illustrates a schematic diagram of a content design system in accordance with one or more embodiments.

FIG. 8 illustrates a schematic diagram of a constrained vector geometry editing system 106 in accordance with one or more embodiments. In particular, FIG. 8 shows a schematic diagram of the editing system 106, the client device 102, and the content design system 104 described above in relation to FIG. 1. As mentioned in relation to FIG. 1, in one or more embodiments, some or all of the components of the editing system 106 are implemented separately from the content design system 104 and the client device 102.

As shown, the client device 102 includes memory 800, including volatile memory, non-volatile memory, storage media, etc. as further described below with respect at least to FIG. 13. The editing system is stored in memory as program code, data structures, etc. and includes a user input manager 802 (such as user input manager 110, discussed above), a selection expansion manager 804 (such as selection expansion manager 114, discussed above), a constraint manager 806 (such as constraint manager 116, discussed above), a constraint engine 808 (such as constraint engine 118, discussed above), and a storage manager 810. Selection expansion manager 804 includes a geometric primitive fitting manager 812, and identifies an active region 814, region of influence 816, and passive region 818 of an input vector graphic. Constraint manager 806 includes one or more constraints 820.

The constrained vector geometry editing system 106 includes a user input manager 802 that allows users to provide input to the editing system. For example, the user input manager 802 allows users to select one or more vector graphics-based objects to edit. In some embodiments, the user input manager 802 enables a user to select one or more segments in a vector graphics file stored or accessible by storage manager 810. In some embodiments, the user input manager 802 allows users to deselect segments that have been automatically selected by the selection expansion manager 804. In some embodiments, the user input manager 802 enables users to add or remove constraints identified by the constraint manager 806 to be imposed on the modifications to the vector graphic made by the user.

Selection expansion manager 804 receives the selection of one or more segments of the vector graphic from user input manager 802 and determines whether the selected segment (s) is part of a larger geometric primitive. As discussed, geometric primitives include lines, circular arcs, parabolas, ellipses, etc. For example, the selection expansion manager identifies adjacent segments that are colinear with the selected segment based on segment properties (e.g., coordinates, angles, etc.). In some embodiments, these include contiguous or non-contiguous segments. As discussed above, the selection expansion manager 804 determines whether a segment is part of a geometric primitive by attempting to fit a geometric primitive to the segment. In some embodiments, this fitting is performed by geometric primitive fitting manager 812 which implements one or more objective functions and/or modified objective functions as discussed above at least with respect to FIGS. 6A and 6B. The geometric primitive fitting manager 812 fits a geometric primitive to the selected segment using an objective function to determine the error between the selected segments and the geometric primitive shape. For example, a modified objective function, as discussed above at least with respect to FIGS. 6A and 6B is used to identify circular arcs by determining and error between one or more segments defining an arc and a circle. If the error is below a threshold, then the segments are identified as belonging to the geometric primitive and added to the active region 814. This expands the user's selection from the particular segment selected to other adjacent segments that collectively form a geometric primitive.

A similar process is then performed by the selection expansion manager to identify the region of influence 816. For example, a segment adjacent, and connected, to the active region is analyzed to determine if it is part of a geometric primitive. If so, the adjacent segment and any other segments that form the geometric primitive are added to the region of influence 816. Any remaining segments in the vector graphic are then added to the passive region 818, which is to remain unchanged due to any modifications made to the active region.

Once regular geometric primitives have been identified in the geometry of the vector graphic, and the segments of the vector graphic have been divided into the active region 814, region of influence 816, and passive region 818, then constraint manager 806 determines one or more constraints 820 to be enforced on each region when solving for the modified geometry. For example, a continuity constraint constrains curve connections to preserve existing C1 and/or G1 (with fixed tangent proportions) continuities in the input geometry using linear constraints. These constraints are inferred from input geometry and applied to all Bezier segments when solving for modified geometry. The intuition is that smooth joins and corners should be retained. A similarity constraint constrains curve segments to change by closest similarity transform as segment end points are displaced. For example, in some embodiments, a similarity constraint is applied to the segments of the region of influence to ensure that the region of influence retains its shape during modifications (e.g., a circular arc remains circular). Additionally, a fixed affine constraint constrains curve segments to respect a specified "fixed" affine transformation initialized to identity at start. In some embodiments, constraint parameters are changed to independently apply scaling, rotation, and translation of the segments it is applied to. This allows user gestures (such as mouse drag or touchscreen gestures) to be mapped to scale, rotate, or translate components of the underlying constraint, and thus then result in multiple meaningful modifications. In some embodiments, this is presented to the designer via different widgets corresponding to each component of affine transformation (scale, rotate, translate).

After the constraints for each region have been identified, when a modification input is received from the designer, the vector graphic, the modification, and the constraints are provided to constraint engine 808. As discussed, the constraints include one or more of a continuity constraint, a similarity constraint, and/or a fixed affine constraint. The constraints are applied to particular portions of the vector graphic depending on the underlying geometry of the vector graphic. The modification is capable of being received in various ways, depending on the vector graphic, the user interface in use, etc. For example, in some embodiments, the designer makes a freeform edit by defining and then moving an editing handle (e.g., by clicking and dragging a vector graphics curve at an arbitrary point—not necessarily a control point).

The constraint engine 808 identifies changes made to the vector graphic based on the editing. In some embodiments, these changes are identified as changes in a mesh network. For example, an editing handle changes the position of one or more points on a curve with respect to a triangular mesh network (which may be invisible to the user). In some embodiments, a mesh network refers to a triangulation of a domain that includes a vector graphic. The mesh network includes node points of triangles covering the space, and the position of the control points relative to the nodes.

The constraint engine 808 updates the mesh network based on the changes according to multiple constraints. For example, according to embodiments of the present disclosure, a vector sculpting solver models the constrained deformation manipulation problem as a nonlinear minimization of deformation energy, defined on a vector graphics mesh structure. Vector sculpting may be subject to satisfying nonlinear constraints preserving structure identified on the graphics. In some cases, the vector sculpting is performed according to a multiple step runtime loop (e.g., including the five steps of a rebuild check, a constrained Sobolev-preconditioned gradient descent, a priority ordered projection, a constrained continuity and binding solve, and a final priority-ordered projection).

In some cases, vector graphic structure is preserved. For example, all cubic Bezier curves remain cubic Beziers over a number of edits. The issues of efficiency and constraint inconsistency are addressed to preserve vector graphic structure. Nonlinear minimization methods that handle nonlinear constraints can be computationally expensive and slow when used in the present disclosure, where interactive rate solutions for tablets and laptops are used.

Thus, in response to free form dragging, the solver produces organic deformation, while preserving the shape of other parts of the vector graphic based on the constraints. This combination of deformation behaviors relies on the solver's ability to model and propagate deformation energies in the mesh domain while also preserving structural constraints. Vector sculpting also provides users the ability to control the spatial extent (or region-of-influence) of a given interaction. For example, when the user manipulates a specific constraint parameter, such as a radius of an outer boundary, the mesh-based deformation energies provide control to influence the manipulation of nearby parts near the outer boundary, such as, for example, smaller concentric arcs. Control of the region-of-influence is useful for freeform deformations. The solver's ability to combine deformation energies with constraints provides for control over editing operations.

The constraint engine 808 updates the vector graphic based on the updated mesh network. For example, the updated vector graphic is displayed to a user after an iteration of a runtime loop involving multiple constraints.

As illustrated in FIG. 8, the content design system 104 also includes a storage manager 810. In general, the storage manager 810 maintains, stores, organizes, and/or retrieves data associated with the editing system 106. For example, the storage manager 810 maintains constraint definitions, manages access to vector graphics (stored locally or at a remote location accessible to the storage manager), stores data representing the active region, passive region, and region of influence as the user makes modifications, etc., as described above. Further, the storage manager 810 communicates with other components of the editing system 106 to facilitate constrained modification of vector graphics.

Each of the components 804-710 of the content design system 104 and their corresponding elements (as shown in FIG. 8) are in communication with one another using any suitable communication technologies. It is recognized that although components 804-710 and their corresponding elements are shown to be separate in FIG. 8, any of components 804-710 and their corresponding elements are combined into fewer components, such as into a single facility or module, divided into more components, or configured into different components as serves a particular embodiment.

The components 804-710 and their corresponding elements comprise software, hardware, or both. For example, the components 804-710 and their corresponding elements comprise one or more instructions stored on a computer-readable storage medium and executable by processors of one or more computing devices. When executed by the one or more processors, the computer-executable instructions of the content design system 104 cause a client device and/or a server device to perform the methods described herein. Alternatively, the components 804-710 and their corresponding elements comprise hardware, such as a special purpose processing device to perform a certain function or group of functions. Additionally, the components 804-710 and their corresponding elements comprise a combination of computer-executable instructions and hardware.

Furthermore, the components 804-710 of the content design system 104, for example, are implementable as one or more stand-alone applications, as one or more modules of an application, as one or more plug-ins, as one or more library functions or functions that are called by other applications, and/or as a cloud-computing model. Thus, the components 804-710 of the content design system 104 are implemented as a stand-alone application, such as a desktop or mobile application. Furthermore, the components 804-710 of the content design system 104 are implemented as one or more web-based applications hosted on a remote server. Alternatively, or additionally, the components of the content design system 104 are implemented in a suit of mobile device applications or "apps." To illustrate, the components of the content design system 104 are implemented in a digital image editing application, including but not limited to ADOBE® ILLUSTRATOR®, ADOBE® PHOTOSHOP®, or ADOBE® CREATIVE CLOUD®. "ADOBE," "ILLUSTRATOR," "PHOTOSHOP," and "CREATIVE CLOUD" are either registered trademarks or trademarks of Adobe Systems Incorporated in the United States and/or other countries.

Figure 9:
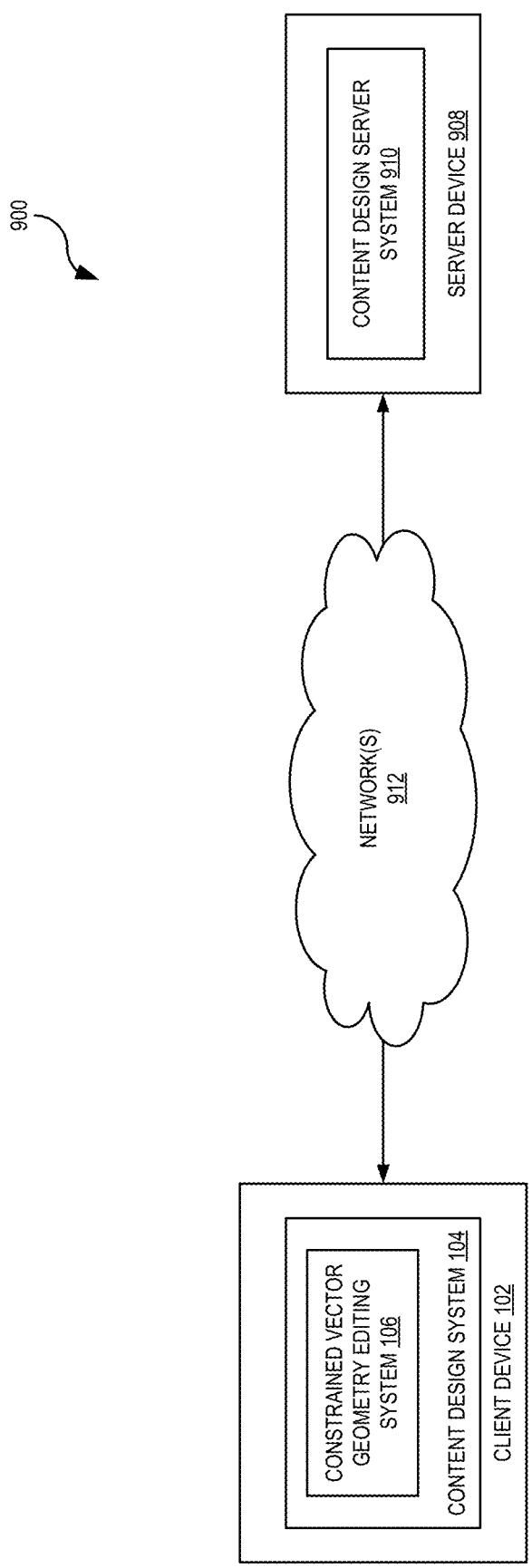
FIG. 9 illustrates a schematic diagram of an exemplary environment in which a content design system is implemented in accordance with one or more embodiments.

FIG. 9 illustrates a schematic diagram of an exemplary environment 900 within which a constrained vector geometry editing system 106 (or simply "editing system" 106) operates. In one or more embodiments, the exemplary environment 900 includes a client device 102, a server device 908, and one or more networks 912. The network(s) 912 include any suitable network over which the computing devices communicate. Example and features of computing devices (e.g., the client device 102 and the server device 908) and networks (e.g., network(s) 912) are discussed in more detail below with regard to FIGS. 12-13.

As illustrated in FIG. 9, the environment 900 includes the client device 102 having a content design system 104 as well as the editing system 106. The content design system 104 generally facilitates the creation, modification, sharing, and/or deletion of graphical content including vector-based content. In one or more embodiments, the content design system 104 is a design application such as ADOBE® ILLUSTRATOR®. In other embodiments, the content design system 104 includes multiple applications, functions, and operations relating to graphical content, such as an application suite, a web-based application, and/or system operations on the client device 102.

As shown in FIG. 9, the content design system 104 includes the editing system 106. In some embodiments, however, the editing system 106 is located on the client device apart from the content design system 104. As mentioned above, and as is explained in detail below, the editing system 106 enables the editing of cubic Bezier splines (e.g., cubic Bezier curves) based on constraints inferred from the underlying geometry of the graphic being edited using various approaches and techniques. As also described previously, the editing system enables vector-based content that includes particular geometric primitives to be more efficiently and more accurately edited than conventional systems. Additional detail regarding the editing system 106 is provided below with respect to subsequent figures.

In addition, the environment 900 includes the server device 908. The server device 908 generates, stores, receives, and/or transmits any type of data, including graphical content and/or cubic Bezier splines. As shown, the server device 908 includes a content design server system 910 that communicates with the content design system 104 on the client device 102. For example, the content design server system 910 transmits graphical content to the client device 102, which enables the client device 102 to edit a vector graphic based on constraints inferred from its underlying geometry. Notably, while only a single server device is shown, the content design server system 910 is implemented across multiple server devices.

While not illustrated, in one or more embodiments, the server device 908 includes all, or a portion of, the editing system 106, such as within the content design server system 910. For example, when located in the server device 908, the editing system 106 comprises an application running on the server device 908 or a portion of a software application that is downloaded to the client device 102. For instance, the editing system 106 includes a web hosting application that allows the client device 102 to interact with content from the content design server system 910 hosted at the server device 908. In this manner, the server device 908 performs constrained modification of vector graphics based on inputs received from a designer using client device 102.

Figure 10:
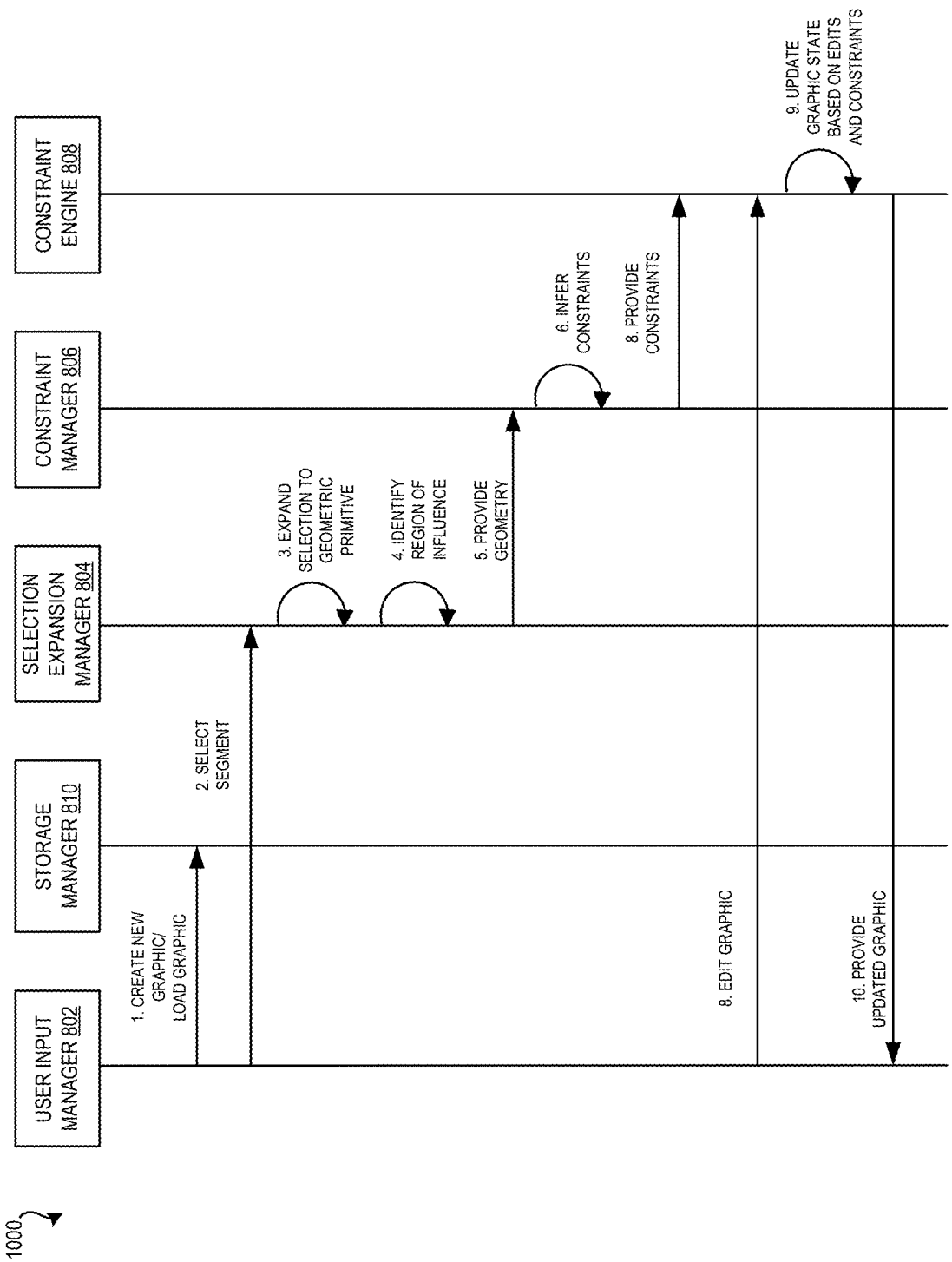
FIG. 10 illustrates a sequence diagram of a content design system in accordance with one or more embodiments.

FIG. 10 illustrates a sequence diagram 1000 of a content design system in accordance with one or more embodiments. As shown in FIG. 10, a user loads an existing vector graphic from a file using user input manager 902 via storage manager 910 at numeral 1. In some embodiments, the user creates a new vector graphic, e.g., by opening to new canvas/workspace in a vector graphics application and drawing the vector graphic. The user selects one or more segments of a vector-based object and the selected segments are passed selection expansion manager 904 by user input manager 902, as shown at numeral 2.

At numeral 3, selection expansion manager 904 expands the user's selection from the one or more segments to include any additional segments that form part of a geometric primitive. As described above, a geometric primitive includes a line, a circular arc, and ellipse or elliptical arc, a parabola, etc. The selection expansion manager 904 identifies contiguous and/or non-contiguous segments to the one or more selected segments that, together with the one or more selected segments, form a geometric primitive. For example, if a user selects a segment forming part of a circular arc, at numeral 2, then at numeral 3 selection expansion manager 904 identifies adjacent segments that also form part of the circular arc and expands the user's selection to include these segments. This expanded selection is the active region which indicates the portion of the vector graphic selected by the user for modification.

At numeral 4, selection expansion manager 904 then identifies a region of influence associated with the active region. For example, segments adjacent to the active region are analyzed to determine if they form part of a geometric primitive. If so, the rest of the geometric primitive is determined, as discussed above, and the segments belonging to that geometric primitive are identified as the region of influence. If the adjacent segment(s) are not part of a geometric primitive, then only the adjacent segment(s) (e.g., those segments connected to the active region at one or more points) are the region of influence. At numeral 5, the underlying geometry (e.g., the geometric primitives) identified at numerals 3 and 4 are passed to constraint manager 906.

At numeral 6, constraint manager 906 infers constraints based on the underlying geometry of the vector graphic and applied to the region of influence and/or the active region of the vector graphic. For example, a continuity constraint, similarity constraint, and/or fixed affine constraint are determined to apply based on the underlying geometry.

At numeral 7, the constraints are provided to constraint engine 908. At numeral 8, the user modifies the vector graphic via user input manager 902 and the modifications are provided to constraint engine 908. As discussed, constraint engine 908 uses the modifications made by the user along with the constraints identified by the constraint manager to constrain the modification of the region of influence when the active region is being modified. For example, the user modifies the vector graphic by translating the active region to a new location and the constraint engine determines how the region of influence is to be modified according to the constraints received at numeral 7. In some embodiments, this includes ensuring that the modified region of influence remains similar to the original region of influence (e.g., an arc-like shape remains arc-like, etc.). At numeral 9, the constraint engine updates the state of the vector graphic based on the modification from the user and the constraints. At numeral 10, the updated vector graphic is displayed to the user via user input manager 902.

Figure 11:
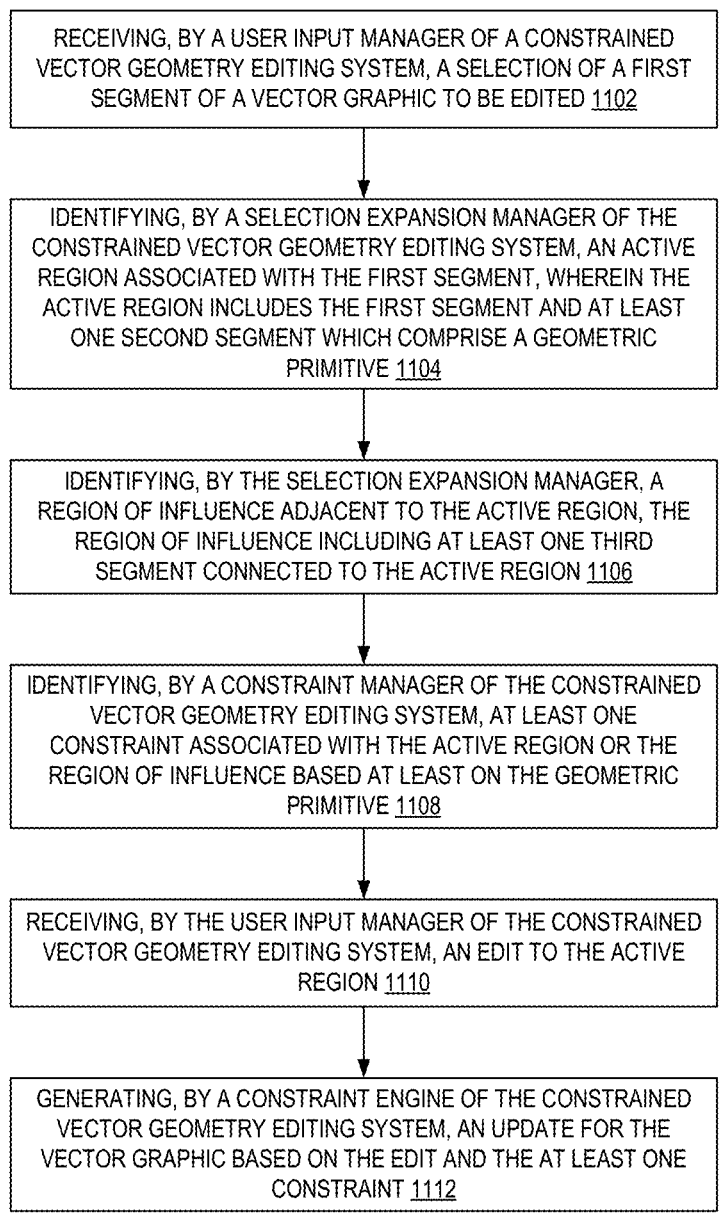
FIG. 11 illustrates a flowchart of a series of acts in a method of constrained modification of vector graphics in accordance with one or more embodiments.

FIGS. 1-10, the corresponding text, and the examples, provide a number of different systems and devices that allows a user to facilitate selection of target individuals within digital visual media. In addition to the foregoing, embodiments are described in terms of flowcharts comprising acts and steps in a method for accomplishing a particular result. For example, FIG. 11 illustrates flowcharts of exemplary methods in accordance with one or more embodiments. The methods described in relation to FIG. 11 are performable with fewer or more steps/acts or the steps/acts are performable in differing orders. Additionally, the steps/acts described herein are repeatable or performable in parallel with one another or in parallel with different instances of the same or similar steps/acts.

FIG. 11 illustrates a flowchart of a series of acts in a method of constrained modification of vector graphics in accordance with one or more embodiments. In one or more embodiments, the method 1100 is performed in a digital medium environment that includes the content design system 114. The method 1100 is intended to be illustrative of one or more methods in accordance with the present disclosure and is not intended to limit potential embodiments. Alternative embodiments include additional, fewer, or different steps than those articulated in FIG. 11.

As illustrated in FIG. 11, the method 1100 includes an act 1102 of receiving, by a user input manager of a constrained vector geometry editing system, a selection of a first segment of a vector graphic to be edited. For example, the user selects the first segment by clicking, tapping, or otherwise interacting with a graphical user interface associated with the vector geometry editing system. As discussed, the vector geometry editing system, in some embodiments, is implemented as part of a content design system running on an electronic device (e.g., a client device, server device, or other electronic device). The content design system provides a graphical user interface through which the user interacts with the content design system As illustrated in FIG. 11, the method 1100 includes an act 1104 of identifying, by a selection expansion manager of the constrained vector geometry editing system, an active region associated with the first segment, wherein the active region includes the first segment and at least one second segment which comprise a geometric primitive. As discussed, the active region includes a segment explicitly selected by the user (e.g., the first segment) and also includes other, adjacent, segments if they collectively correspond to a geometric primitive.

For example, in some embodiments, identifying the active region further includes determining the at least one second segment is colinear with the first segment and adding the at least one second segment to the active region, wherein the geometric primitive is a straight line. In some embodiments, the at least one second segment is non-contiguous with the first segment. Additionally, or alternatively, identifying the active region further includes iteratively sampling a plurality of points from the at least one second segment and fitting a circle to the plurality of points, determining an error of a fit of the circle to the plurality of points is less than a threshold, and adding the at least one second segment to the active region, wherein the geometric primitive is a circular arc.

As illustrated in FIG. 11, the method 1100 includes an act 1106 of identifying, by the selection expansion manager, a region of influence adjacent to the active region, the region of influence including at least one third segment connected to the active region. As discussed, the region of influence includes one or more segments that connect the active region to the rest of the vector graphic. For example, at least one segment from the region of influence is directly connected to at least one segment from the active region. To maintain the geometry of the vector graphic as the active region is modified, the region of influence is automatically expanded to include any other segments that correspond to a geometric primitive. For example, in some embodiments, identifying the region of influence includes determining the at least one third segment is part of a second geometric primitive, identifying at least one fourth segment adjacent to the at least one third segment that is part of the second geometric primitive, and adding the at least one fourth segment to the region of influence.

As illustrated in FIG. 11, the method 1100 includes an act 1108 of identifying, by a constraint manager of the constrained vector geometry editing system, at least one constraint associated with the active region or the region of influence based at least on the geometric primitive. For example, the at least one constraint includes a continuity constraint, a similarity constraint, or a fixed affine constraint.

As illustrated in FIG. 11, the method 1100 includes an act 1110 of receiving, by the user input manager of the constrained vector geometry editing system, an edit to the active region. In some embodiments, the edit is a translation of the active region from a first location to a second location. As illustrated in FIG. 11, the method 1100 includes an act 1112 of generating, by a constraint engine of the constrained vector geometry editing system, an update for the vector graphic based on the edit and the at least one constraint.

Figure 12:
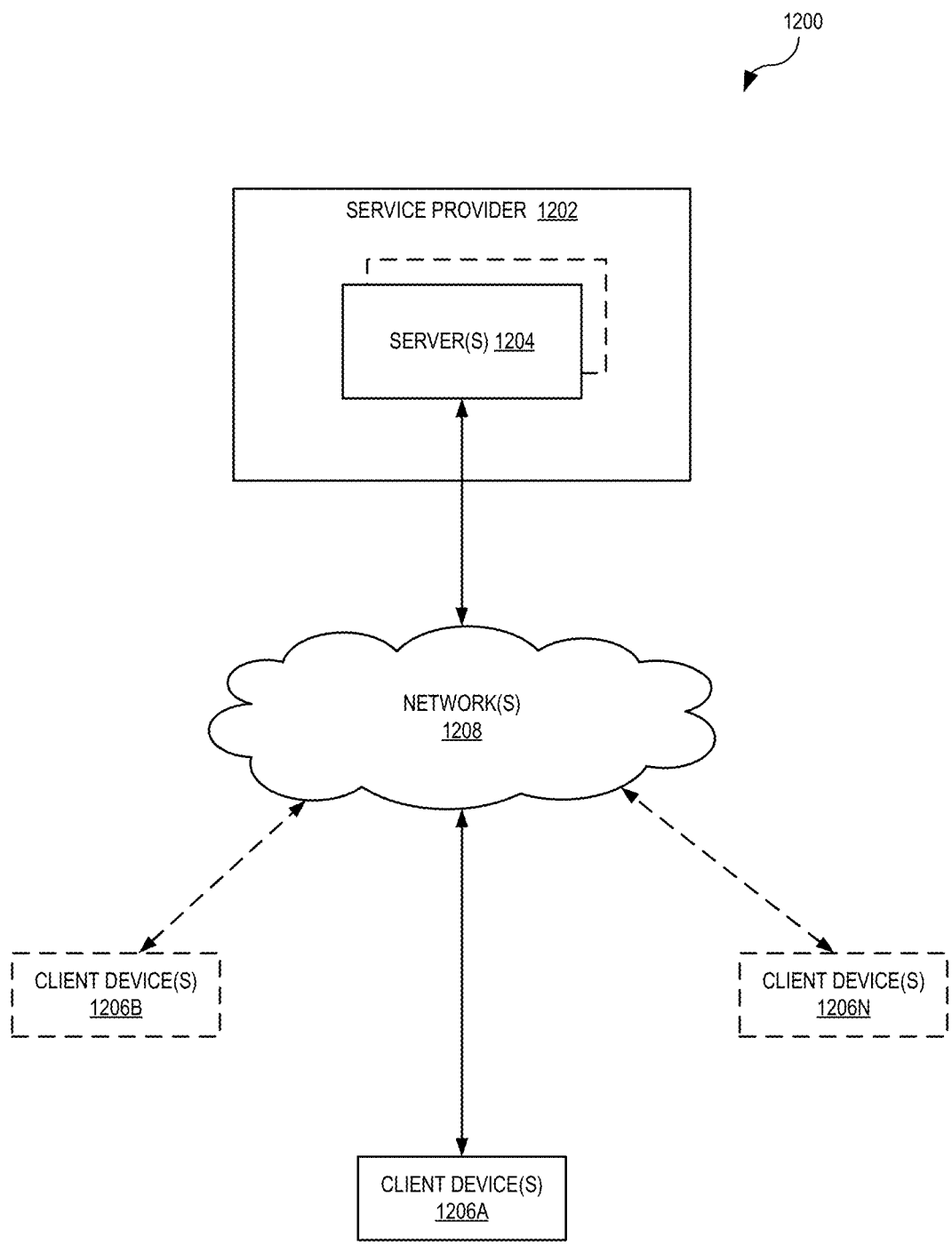
FIG. 12 illustrates a schematic diagram of an exemplary environment in which the content design system operates in accordance with one or more embodiments.

FIG. 12 illustrates a schematic diagram of an exemplary environment 1200 in which the content design system 124 operates in accordance with one or more embodiments. In one or more embodiments, the environment 1200 includes a service provider 1202 which includes one or more servers 1204 connected to a plurality of client devices 1206A-1206N via one or more networks 1208. The client devices 1206A-1206N, the one or more networks 1208, the service provider 1202, and the one or more servers 1204 communicate with each other or other components using any communication platforms and technologies suitable for transporting data and/or communication signals, including any known communication technologies, devices, media, and protocols supportive of remote data communications, examples of which are described in more detail below with respect to FIG. 13.

Although FIG. 12 illustrates a particular arrangement of the client devices 1206A-1206N, the one or more networks 1208, the service provider 1202, and the one or more servers

1204, various additional arrangements are possible. For example, the client devices 1206A-1206N directly communicate with the one or more servers 1204, bypassing the network 1208. Or alternatively, the client devices 1206A-1206N directly communicate with each other. The service provider 1202 is a public cloud service provider which owns and operates their own infrastructure in one or more data centers and provides this infrastructure to customers and end users on demand to host applications on the one or more servers 1204. The servers include one or more hardware servers (e.g., hosts), each with its own computing resources (e.g., processors, memory, disk space, networking bandwidth, etc.) which are securely divided between multiple customers, each of which host their own applications on the one or more servers 1204. In some embodiments, the service provider is a private cloud provider which maintains cloud infrastructure for a single organization. The one or more servers 1204 similarly include one or more hardware servers, each with its own computing resources, which are divided among applications hosted by the one or more servers for use by members of the organization or their customers.

Similarly, although the environment 1200 of FIG. 12 is depicted as having various components, the environment 1200 has additional or alternative components. For example, the environment 1200 is implemented on a single computing device with the content design system 124. In particular, the content design system 124 is implemented in whole or in part on the client device 1202A.

As illustrated in FIG. 12, the environment 1200 includes client devices 1206A-1206N. The client devices 1206A-1206N comprise any computing device. For example, client devices 1206A-1206N comprise one or more personal computers, laptop computers, mobile devices, mobile phones, tablets, special purpose computers, TVs, or other computing devices, including computing devices described below with regard to FIG. 13. Although three client devices are shown in FIG. 12, it is appreciated that client devices 1206A-1206N comprise any number of client devices (greater or smaller than shown).

Moreover, as illustrated in FIG. 12, the client devices 1206A-1206N and the one or more servers 1204 communicate via one or more networks 1208. The one or more networks 1208 represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1208 include any suitable network over which the client devices 1206A-1206N access service provider 1202 and server 1204, or vice versa. The one or more networks 1208 are discussed in more detail below with regard to FIG. 13.

In addition, the environment 1200 also includes one or more servers 1204. The one or more servers 1204 generate, store, receive, and/or transmit any type of data, including input image data 1212, output image data 1214, or other information. For example, a server 1204 receives data from a client device, such as the client device 1206A, and send the data to another client device, such as the client device 1202B and/or 1202N. The server 1204 also transmits electronic messages between one or more users of the environment 1200. In one example embodiment, the server 1204 is a data server. The server 1204 also comprises a communication server or a web-hosting server. Additional details regarding the server 1204 are discussed below with respect to FIG. 13.

As mentioned, in one or more embodiments, the one or more servers 1204 include or implement at least a portion of the content design system 124. In particular, the content design system 124 comprises an application running on the one or more servers 1204 or a portion of the content design system 124 is downloaded from the one or more servers 1204. For example, the content design system 124 includes a web hosting application that allows the client devices 1206A-1206N to interact with content hosted at the one or more servers 1204. To illustrate, in one or more embodiments of the environment 1200, one or more client devices 1206A-1206N access a webpage supported by the one or more servers 1204. In particular, the client device 1206A runs a web application (e.g., a web browser) to allow a user to access, view, and/or interact with a webpage or website hosted at the one or more servers 1204.

Upon the client device 1206A accessing a webpage or other web application hosted at the one or more servers 1204, in one or more embodiments, the one or more servers 1204 provide access to one or more drawing files that include Bezier geometry stored at the one or more servers 1204. Moreover, the client device 1206A receives a request (i.e., via user input) to modify one or more segments of the Bezier geometry, and provide the request to the one or more servers 1204. Upon receiving the request, the one or more servers 1204 automatically performs the methods and processes described above to enable constrained modification of the Bezier geometry in the drawing file.

As just described, the content design system 124 is implemented in whole, or in part, by the individual elements 1202-1208 of the environment 1200. It is appreciated that although certain components of the content design system 124 are described in the previous examples with regard to particular elements of the environment 1200, various alternative implementations are possible. For instance, in one or more embodiments, the content design system 124 is implemented on any of the client devices 1206A-N. Similarly, in one or more embodiments, the content design system 124 is implemented on the one or more servers 1204. Moreover, different components and functions of the content design system 124 is implemented separately among client devices 1206A-1206N, the one or more servers 1204, and the network 1208.

Embodiments of the present disclosure comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein are implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media include any available media that are accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which is used to store desired program code means in the form of computer-executable instructions or data structures and which is accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links which are used to carry desired program code means in the form of computer-executable instructions or data structures and which are accessed by a general purpose or special purpose computer. Combinations of the above are included within the scope of computer-readable media.

Further, upon reaching various computer system components, program code means in the form of computer-executable instructions or data structures are transferred automatically from transmission media to non-transitory computer-readable storage media (devices) (or vice versa). For example, computer-executable instructions or data structures received over a network or data link are buffered in RAM within a network interface module (e.g., a "NIC"), and then eventually transferred to computer system RAM and/or to less volatile computer storage media (devices) at a computer system. Thus, it is to be understood that non-transitory computer-readable storage media (devices) are included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions are, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art appreciate that some embodiments of the disclosure are practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure is implementable in distributed system environments where local and remote computer systems, which are linked (either by hardwired data links, wireless data links, or by a combination of hardwired and wireless data links) through a network, both perform tasks. In a distributed system environment, program modules are located in both local and remote memory storage devices.

Embodiments of the present disclosure are implemented in cloud computing environments. In this description, "cloud computing" is defined as a model for enabling on-demand network access to a shared pool of configurable computing resources. For example, cloud computing is employed in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model includes various characteristics such as, for example, on-demand self-service, broad network access, resource pooling, rapid elasticity, measured service, and so forth. A cloud-computing model also exposes various service models, such as, for example, Software as a Service ("SaaS"), Platform as a Service ("PaaS"), and Infrastructure as a Service ("IaaS"). A cloud-computing model is deployed using different deployment models such as private cloud, community cloud, public cloud, hybrid cloud, and so forth. In this description and in the claims, a "cloud-computing environment" is an environment in which cloud computing is employed.

Figure 13:
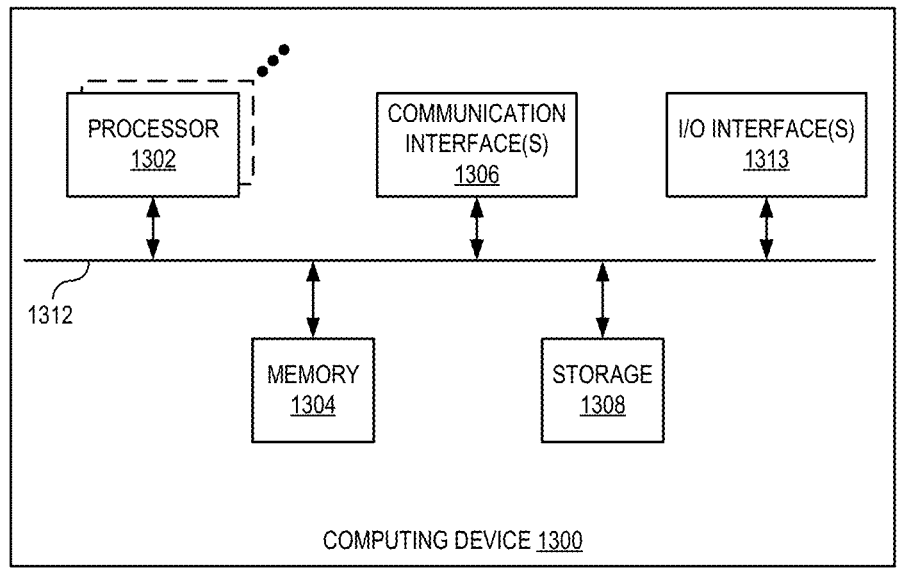
FIG. 13 illustrates a block diagram of an exemplary computing device in accordance with one or more embodiments.

FIG. 13 illustrates, in block diagram form, an exemplary computing device 1300 that is configured to perform one or more of the processes described above. One appreciates that one or more computing devices such as the computing device 1300 implement the content design system. As shown by FIG. 13, the computing device comprises a processor 1302, memory 1304, one or more communication interfaces 1306, a storage device 1308, and one or more I/O devices/interfaces 1310. In certain embodiments, the computing device 1300 includes fewer or more components than those shown in FIG. 13. Components of computing device 1300 shown in FIG. 13 are described in additional detail below.

In particular embodiments, processor(s) 1302 includes hardware for executing instructions, such as those making up a computer program. As an example, and not by way of limitation, to execute instructions, processor(s) 1302 retrieves (or fetch) the instructions from an internal register, an internal cache, memory 1304, or a storage device 1308 and decode and execute them. In various embodiments, the processor(s) 1302 includes one or more central processing units (CPUs), graphics processing units (GPUs), field programmable gate arrays (FPGAs), systems on chip (SoC), or other processor(s) or combinations of processors.

The computing device 1300 includes memory 1304, which is coupled to the processor(s) 1302. The memory 1304 is used for storing data, metadata, and programs for execution by the processor(s). The memory 1304 includes one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 includes internal or distributed memory.

The computing device 1300 further includes one or more communication interfaces 1306. A communication interface 1306 includes hardware, software, or both. The communication interface 1306 provides one or more interfaces for communication (such as, for example, packet-based communication) between the computing device and one or more other computing devices 1300 or one or more networks. As an example, and not by way of limitation, communication interface 1306 includes a network interface controller (NIC) or network adapter for communicating with an Ethernet or other wire-based network or a wireless NIC (WNIC) or wireless adapter for communicating with a wireless network, such as a WI-FI. The computing device 1300 further includes a bus 1312. The bus 1312 comprises hardware, software, or both that couples components of computing device 1300 to each other.

The computing device 1300 includes a storage device 1308 includes storage for storing data or instructions. As an example, and not by way of limitation, storage device 1308 comprises a non-transitory storage medium described above. The storage device 1308 includes a hard disk drive (HDD), flash memory, a Universal Serial Bus (USB) drive or a combination these or other storage devices.

The computing device 1300 also includes one or more input or output ("I/O") devices/interfaces 1310, which are provided to allow a user to provide input to (such as user strokes), receive output from, and otherwise transfer data to and from the computing device 1300. These I/O devices/interfaces 1310 includes a mouse, keypad or a keyboard, a touch screen, camera, optical scanner, network interface, modem, other known I/O devices or a combination of such I/O devices/interfaces 1310. The touch screen is activated with a stylus or a finger.

The I/O devices/interfaces 1310 includes one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1310 is configured to provide graphical data to a display for presentation to a user. The graphical data is representative of one or more graphical user interfaces and/or any other graphical content as serves a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments include other specific forms without departing from its spirit or essential characteristics. The described embodiments are to be considered in all respects only as illustrative and not restrictive. For example, the methods described herein are performable with fewer or more steps/acts or the steps/acts are performable in differing orders. Additionally, the steps/acts described herein are repeatable or performable in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor is it to be understood to, imply that a given embodiment requires at least one of A, at least one of B, or at least one of C to each be present.

We claim:

1. A computer-implemented method comprising:
   receiving, by a user input manager of a constrained vector geometry editing system, a selection of a first segment of a vector graphic to be edited;
   identifying, by a selection expansion manager of the constrained vector geometry editing system, an active region associated with the first segment, wherein the active region includes the first segment and at least one second segment which comprise a geometric primitive;
   identifying, by the selection expansion manager, a region of influence adjacent to the active region, the region of influence including at least one third segment connected to the active region;
   identifying, by a constraint manager of the constrained vector geometry editing system, at least one constraint associated with the active region or the region of influence based at least on the geometric primitive;
   receiving, by the user input manager of the constrained vector geometry editing system, an edit to the active region; and
   generating, by a constraint engine of the constrained vector geometry editing system, an update for the vector graphic based on the edit and the at least one constraint.

2. The computer-implemented method of claim 1, wherein identifying, by a selection expansion manager of the constrained vector geometry editing system, an active region associated with the first segment, wherein the active region includes the first segment and at least one second segment which comprise a geometric primitive further comprises:
   determining the at least one second segment is colinear with the first segment; and
   adding the at least one second segment to the active region, wherein the geometric primitive is a straight line.

3. The computer-implemented method of claim 2, wherein the at least one second segment is non-contiguous with the first segment.

4. The computer-implemented method of claim 1, wherein identifying, by a selection expansion manager of the constrained vector geometry editing system, an active region associated with the first segment, wherein the active region includes the first segment and at least one second segment which comprise a geometric primitive further comprises:
   iteratively sampling a plurality of points from the at least one second segment and fitting a circle to the plurality of points;
   determining an error of a fit of the circle to the plurality of points is less than a threshold; and
   adding the at least one second segment to the active region, wherein the geometric primitive is a circular arc.

5. The computer-implemented method of claim 1, wherein identifying, by the selection expansion manager, a region of influence adjacent to the active region, the region of influence including at least one third segment connected to the active region, further comprises:
   determining the at least one third segment is part of a second geometric primitive;

identifying at least one fourth segment adjacent to the at least one third segment that is part of the second geometric primitive; and adding the at least one fourth segment to the region of influence.

6. The computer-implemented method of claim 1, wherein the at least one constraint includes a continuity constraint, a similarity constraint, or a fixed affine constraint.

7. The computer-implemented method of claim 1, wherein the edit is a translation of the active region from a first location to a second location.

8. A system comprising:
a constrained vector geometry editing system, including at least one processor comprising:
  a user input manager to receive a selection of a first segment of a vector graphic to be edited;
  a selection expansion manager to:
    identify an active region associated with the first segment, wherein the active region includes the first segment and at least one second segment which comprise a geometric primitive; and
    identify a region of influence adjacent to the active region, the region of influence including at least one third segment connected to the active region;
  a constraint manager to identify at least one constraint associated with the active region or the region of influence based at least on the geometric primitive;
  the user input manager to receive an edit to the active region; and
  a constraint engine to generate an update for the vector graphic based on the edit and the at least one constraint.

9. The system of claim 8, wherein to identify an active region associated with the first segment, wherein the active region includes the first segment and at least one second segment which comprise a geometric primitive, the selection expansion manager is further configured to:
  determine the at least one second segment is colinear with the first segment; and
  add the at least one second segment to the active region, wherein the geometric primitive is a straight line.

10. The system of claim 9, wherein the at least one second segment is non-contiguous with the first segment.

11. The system of claim 8, wherein to identify an active region associated with the first segment, wherein the active region includes the first segment and at least one second segment which comprise a geometric primitive, the selection expansion manager is further configured to:
  iteratively sample a plurality of points from the at least one second segment and fitting a circle to the plurality of points;
  determine an error of a fit of the circle to the plurality of points is less than a threshold; and
  add the at least one second segment to the active region, wherein the geometric primitive is a circular arc.

12. The system of claim 8, wherein to identify a region of influence adjacent to the active region, the region of influence including at least one third segment connected to the active region, the selection expansion manager is further configured to:
  determine the at least one third segment is part of a second geometric primitive;
  identify at least one fourth segment adjacent to the at least one third segment that is part of the second geometric primitive; and add the at least one fourth segment to the region of influence.

13. The system of claim 8, wherein the at least one constraint includes a continuity constraint, a similarity constraint, or a fixed affine constraint.

14. The system of claim 8, wherein the edit is a translation of the active region from a first location to a second location.

15. A system, comprising:
  means for receiving a selection of a first segment of a vector graphic to be edited;
  means for identifying an active region associated with the first segment, wherein the active region includes the first segment and at least one second segment which comprise a geometric primitive;
  means for identifying a region of influence including at least one third segment connected to the active region;
  means for identifying at least one constraint associated with the active region or the region of influence based at least on the geometric primitive;
  means for receiving an edit to the active region; and
  means for generating an update for the vector graphic based on the edit and the at least one constraint.

16. The system of claim 15, wherein the means for identifying an active region associated with the first segment, wherein the active region includes the first segment and at least one second segment which comprise a geometric primitive further comprises:
  means for determining the at least one second segment is colinear with the first segment; and
  means for adding the at least one second segment to the active region, wherein the geometric primitive is a straight line.

17. The system of claim 16, wherein the at least one second segment is non-contiguous with the first segment.

18. The system of claim 15, wherein the means for identifying an active region associated with the first segment, wherein the active region includes the first segment and at least one second segment which comprise a geometric primitive further comprises:
  means for iteratively sampling a plurality of points from the at least one second segment and fitting a circle to the plurality of points;
  means for determining an error of a fit of the circle to the plurality of points is less than a threshold; and
  means for adding the at least one second segment to the active region, wherein the geometric primitive is a circular arc.

19. The system of claim 15, wherein the means for identifying a region of influence adjacent to the active region, the region of influence including at least one third segment connected to the active region, further comprises:
  means for determining the at least one third segment is part of a second geometric primitive;
  means for identifying at least one fourth segment adjacent to the at least one third segment that is part of the second geometric primitive; and
  means for adding the at least one fourth segment to the region of influence.

20. The system of claim 15, wherein the at least one constraint includes a continuity constraint, a similarity constraint, or a fixed affine constraint.

* * * * *